(12) United States Patent
Yamada

(10) Patent No.: US 8,015,066 B2
(45) Date of Patent: Sep. 6, 2011

(54) POS SYSTEM, POS SERVER, LOCAL TERMINAL, METHOD OF DEALING MANAGEMENT, AND RECORDING MEDIUM

(75) Inventor: Tokuhiro Yamada, Tokyo (JP)

(73) Assignee: Kabushiki Kaisha Visual Japan, Tokyo (JP)

(*) Notice: Subject to any disclaimer, the term of this patent is extended or adjusted under 35 U.S.C. 154(b) by 1403 days.

(21) Appl. No.: 10/494,253

(22) PCT Filed: Nov. 1, 2001

(86) PCT No.: PCT/JP01/09598
§ 371 (c)(1),
(2), (4) Date: Apr. 30, 2004

(87) PCT Pub. No.: WO03/038774
PCT Pub. Date: May 8, 2003

(65) Prior Publication Data
US 2004/0267546 A1 Dec. 30, 2004

(51) Int. Cl.
*G06E 20/00* (2006.01)
(52) U.S. Cl. .............. 705/16; 709/203; 714/11
(58) Field of Classification Search .................. None
See application file for complete search history.

(56) References Cited

U.S. PATENT DOCUMENTS

| | | | |
|---|---|---|---|
| 5,060,185 A | | 10/1991 | Naito et al. |
| 5,343,477 A | * | 8/1994 | Yamada ............................. 714/4 |
| 5,739,919 A | * | 4/1998 | Lee et al. ....................... 358/407 |
| 5,781,910 A | | 7/1998 | Gostanian et al. |
| 6,782,392 B1 | * | 8/2004 | Weinberger et al. ........ 707/104.1 |
| 7,334,157 B1 | * | 2/2008 | Graf et al. ......................... 714/13 |
| 2001/0056438 A1 | * | 12/2001 | Ito ................................... 707/204 |
| 2002/0147767 A1 | * | 10/2002 | Brice et al. ..................... 709/203 |
| 2003/0046502 A1 | * | 3/2003 | Okazaki ......................... 711/162 |

FOREIGN PATENT DOCUMENTS

| | | |
|---|---|---|
| EP | 1109138 A2 | 11/2002 |
| JP | 2001-184307 | 7/2001 |
| JP | 2001-243277 | 9/2001 |
| JP | 2002-24424 | 1/2002 |
| JP | 2003067847 A * | 3/2003 |

OTHER PUBLICATIONS

EP Office Action dated Mar. 11, 2011, 5 pages.
European Search Report, dated Jun. 4, 2010 (3 pages).

* cited by examiner

*Primary Examiner* — Luna Champagne
(74) *Attorney, Agent, or Firm* — Reising Ethington P.C.

(57) ABSTRACT

To provide the POS server which can respond immediately against request from local terminals, the POS server 100 according to this invention, which controls dealings of products at a plurality of stores, includes a plurality of control apparatuses 210 connecting with a plurality of local terminals 300 provided at a plurality of stores. Each of the plurality of control apparatuses 210 a dealing database 116 storing information of dealings of the products at the local terminals 300, a receiving device 152 receiving the database operating instruction for updating the dealing database 116 with the dealing of the products from the local terminal 300, and a database updating device 162 updating the dealing database 116 according to the received database operating instruction. Each receiving device 152 of the plurality of control apparatuses 210 receives the same database operating instruction which is transmitted to the control apparatuses from the local terminal 300.

28 Claims, 13 Drawing Sheets

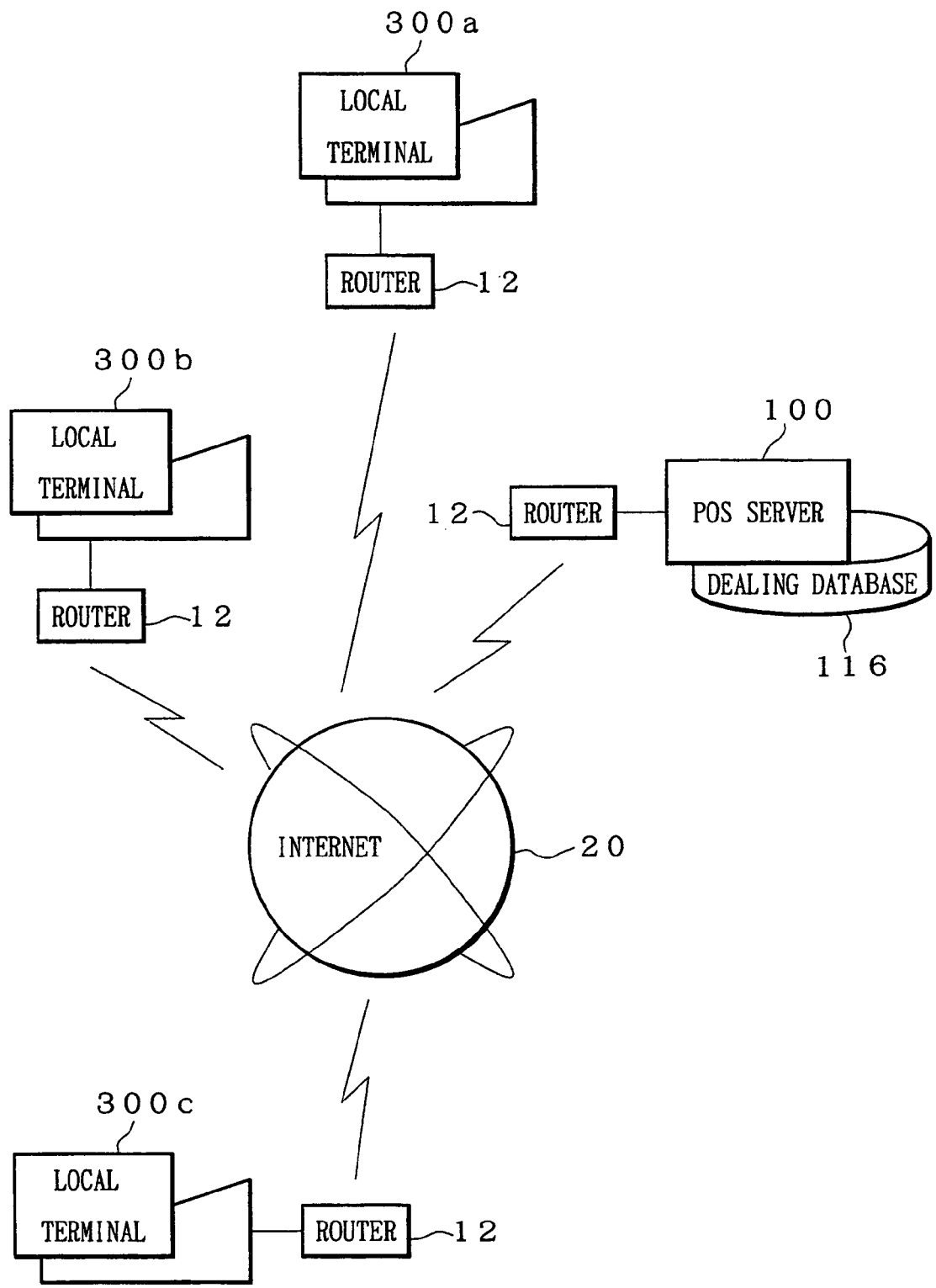
F I G. 1

400

| PRODUCT CODE | PRODUCT NUMBER | PRODUCT NAME | SELLING PRICE | AMOUNT OF STOCK |
|---|---|---|---|---|
|  |  |  |  |  |
|  |  |  |  |  |
|  |  |  |  |  |

| STORE ID | DATE | CLASS | SLIP NUMBER | PRODUCT CODE | QUANTITY | UNIT PRICE | TOTAL PRICE | TAX |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |

FIG. 9

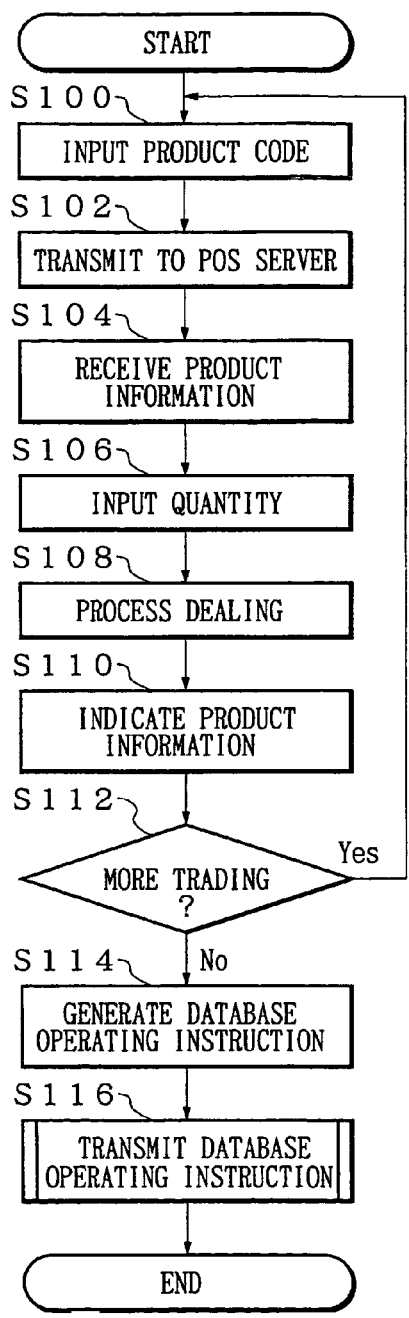
F I G. 10
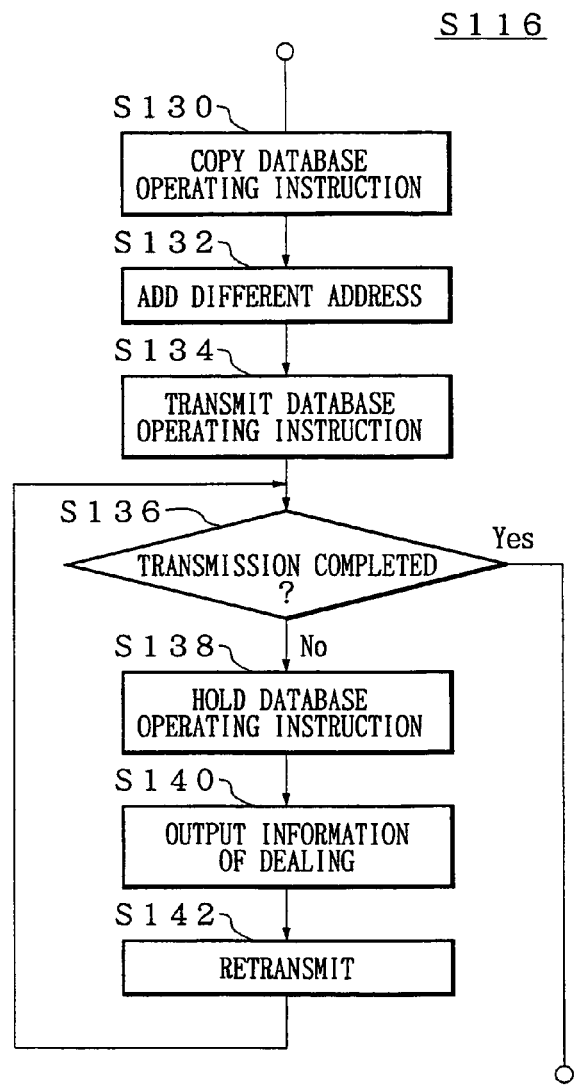
F I G. 11

POS SYSTEM, POS SERVER, LOCAL TERMINAL, METHOD OF DEALING MANAGEMENT, AND RECORDING MEDIUM

BACKGROUND OF THE INVENTION

1. Field of the Invention

This invention relates to a POS (Point-Of-Sales) server (server for managing information at point of sales), a local terminal at a store, a POS system, a method of dealing management and a recording medium. This invention relates especially to a POS server for managing deals of products at a plurality of stores, local terminals connected with the POS server, a POS system having the POS server and local terminals, a method of dealing management and a recording medium storing a program for above object.

2. Description of the Related Art

A POS system is usually applied for sales management in retail business area such as a convenience store and a supermarket. A local terminal connecting with the POS server through LAN (Local Area Network) is provided at a store. When there is a plurality of stores in case of chain store or the like, a single POS server may manage a plurality of local terminals provided at different stores.

When a product is sold at the store, a price attached on the product and a barcode printed or stuck on a packaging are read with a scanner and the local terminal counts sales of the product.

Regardless of the number of local terminals provided at the store, the POS server communicating with an upper server at a central office is usually installed at the store so as to build a client-server system.

It requires a large cost to build a usual POS system. If the server is installed at a local terminal side, maintenance of the local terminal is required.

To connect the POS server at the store and the upper server at the central office all day costs uneconomically. Therefore, the POS server may transmit and receive data between the upper server at several times of connection per day. Thereby, timing for transmitting and receiving information is restricted so that a new master file of products and other information cannot be transmitted and received at required timing. To build the upper server which can communicate with a lot of local terminals simultaneously by one-to-one costs a great deal.

To overcome the above drawback, one object of this invention is to provide a POS server, a local terminal, a POS system, a method of dealing management, and a recording medium. The object is reached by combining features described in independent claims in this invention. Depending claims limit more advantageous physical examples according to this invention.

SUMMARY OF THE INVENTION

According to the first embodiment of this invention, a POS server managing deals of products at a plurality of stores has a plurality of control apparatuses connecting with a plurality of local terminals provided at said plurality of stores. Each of the plurality of control apparatuses includes a dealing database for storing information of the deals of products operated at the local terminals, a receiving device for receiving a database operating instruction to update the dealing database about the deals of products, and a database updating device for updating the dealing database according to the database operating instruction to be received whenever the database operating instruction is received from the local terminals. Each of the receiving devices of the plurality of control apparatuses receives a same database operating instruction transmitted to the control apparatus from the local terminal.

The control apparatus may further comprise a holding device for holding the received database operating instruction, a matching check device for checking matching of the database operating instruction held at each of the holding devices of the plurality of control apparatuses and the database operating instruction corresponding thereto, and a recovering device for recovering said database operating instruction lost at the holding device of one of the control apparatuses by getting that from any one of the holding devices of said control apparatuses, that have the database operating instruction which is lost, other than the one of the control apparatuses. The database updating device may update the dealing database according to the recovered database operating instruction.

The matching check device may check matching of the database operating instruction held at each of the holding devices of the plurality of control apparatuses at intervals of a predetermined time.

The database updating device may update the dealing database according to the database operating instruction whenever a dealing at the local terminal is completed.

The matching check device may check matching of the database operating instruction after said database updating device updates said dealing database.

The matching check device may check matching of the database operating instruction held at each of the holding devices of the plurality of control apparatuses, and when matching of the database operating instruction is checked, the database updating device may update the dealing database according to the database operating instruction.

When matching of the database operating instruction cannot be checked, the recovering device may recover the database operating instruction, and when the recovering device recovers the database operating instruction, the database updating device updates the dealing database according to the recovered database operating instruction.

The control apparatus may furthermore comprise a deleting device for deleting the database operating instruction, which matching is checked by the matching check device, from the database operating instructions held at each of the holding devices of the plurality of control apparatuses in a condition that the database updating device updated the database according to the database operating instruction.

The POS server may further comprise a backup device for storing same information of the deals of products as that stored in the dealing database of the control apparatus. The backup device may include a receiving device for receiving the database operating instruction transmitted toward the backup device, and a holding device for holding the database operating instruction to be received. The recovering device may recover the database operating instruction lost at the holding device of the control apparatuses by getting that from the holding device of the backup device.

The POS server may furthermore comprise the plurality of control apparatuses connecting with different local terminals and a total control apparatus for storing information of the deals of products stored in the plurality of control apparatuses. The total control apparatus may include a receiving device for receiving the database operating instruction transmitted toward the total control apparatus by the local terminal, a total dealing database for storing information of the deals of products operated at the local terminals being controlled by the POS server and a database updating device for updating the dealing database according to the received database operating instruction. The at least one receiving device of the control apparatuses and the receiving device of the total control apparatus may receive the same database operating instruction transmitted toward them from the local terminal.

The POS server may furthermore comprise the plurality of control apparatuses connecting with different local terminals and a total control apparatus for storing information of the deals of products stored in the plurality of control apparatuses. The total control apparatus may include a receiving device for receiving the database operating instruction held in the holding devices of the plurality of control apparatuses from any one of the control apparatuses, a total dealing database for storing information of the deals of products operated at the local terminals being controlled by the POS server and a database updating device for updating the database according to the received database operating instruction.

The receiving device of the total control apparatus may receive the database operating instruction from any one of the plurality of control apparatuses at intervals of a predetermined time.

The total control apparatus may further include a holding device for holding the received database operating instruction, a matching check device for checking matching of the database operating instruction received by the total control apparatus and the database operating instruction held at the control apparatuses which has to store the same database operating instruction as that being received by the total control apparatus.

The POS server may furthermore comprise a deleting device for deleting the database operating instruction from the holding devices and setting the dealing complete under an essential condition that the database updating device of the control apparatus updated the dealing database according to the database operating instruction, and the dealing databases of the total control apparatus when the matching check device of the control apparatus and the total control apparatus checked matching of the database operating instructions held in the respective holding devices of the control apparatus and the total control apparatus.

According to the second embodiment of this invention, a POS server for managing deals of products at a plurality of stores comprises a dealing database for storing information of the deals of products operated at local terminals provided in the plurality of stores, a receiving device for receiving a plurality of same database operating instructions to update the dealing database about the deals of products from the local terminals every time the deals of products with at least one customer is completed, and a database updating device for updating the dealing database according to the received database operating instruction.

According to the third embodiment of this invention, a local terminal, which is connected with a POS server having a dealing database for storing information of deals of products at a plurality of stores, comprises a dealing management unit for processing dealing management of the deals of products operated at the stores, a generating unit for generating a database operating instruction to update the dealing database of the POS server with the dealing management, a copy unit for making a copy of the database operating instruction, an addressing unit for adding a different address respectively on a plurality of the database operating instructions, and a transmitting unit for transmitting the plurality of database operating instructions added the addresses toward respective the addresses.

According to the fourth embodiment of this invention, a local terminal, which is connected with a POS server having a dealing database for storing information of deals of products at a plurality of stores, comprises a dealing management unit for processing dealing management of the deals of products operated at the stores, a generating unit for generating a database operating instruction to update the dealing database of the POS server with the dealing management, a copy unit for making a copy of the database operating instruction, an addressing unit for adding a same address respectively on a plurality of the database operating instructions, and a transmitting unit for transmitting the plurality of database operating instructions added the addresses respectively toward the same address.

The copy unit may make a copy of the generated database operating instruction whenever the dealing management unit completes dealing management.

The local terminal may be connected with the control apparatus and the backup device of the POS server. The addressing unit may add addresses of the backup device and the control apparatus of the POS server onto the plurality of database operating instructions.

The local terminal may be connected with at least one of the plurality of control apparatuses of the POS server and with the total control apparatus managing the plurality of control apparatuses. The addressing unit may add addresses of at least one of the control apparatuses connecting with the terminals and the total control apparatus onto the plurality of database operating instructions.

According to the fifth embodiment of this invention, a POS system includes a POS server with a dealing database for storing information of deals of products operated at a plurality of stores and local terminals at the plurality of stores being connected with the POS server. The local terminal comprises a dealing management unit for processing dealing management of the deals of products operated at the stores, a generating unit for generating a database operating instruction to update the dealing database of the POS server with the dealing management, a copy unit for making a copy of the database operating instruction, an addressing unit for adding a different address respectively on a plurality of the database operating instructions, and a transmitting unit for transmitting the plurality of database operating instructions being added the addresses toward respective the addresses. The POS server has a plurality of control apparatuses connecting with the plurality of local terminals provided at the plurality of stores. Each of the plurality of control apparatuses comprises a dealing database for storing information of the deals of products operated at the local terminals, a receiving device for receiving a database operating instruction to update the dealing database about the deals of products and a database updating device for updating the dealing database according to the received database operating instruction. Each of the receiving devices of the plurality of control apparatuses receives the database operating instruction transmitted to the control apparatus from the local terminal.

According to the sixth embodiment of this invention, a method of dealing management for managing deals of products at a plurality of stores, comprises steps of receiving a plurality of same database operating instructions to update a dealing database for storing information of the deals of products operated at local terminals provided in the stores about the operated deals of products from the local terminals every time the deals of products with at least one customer is completed, and updating the dealing database according to the database operating instruction to be received.

According to the seventh embodiment of this invention, a method of dealing management for managing deals of products by using a POS server having a dealing database for storing information of the deals of products at a plurality of stores, comprises steps of processing dealing management of the deals of products operated at the stores, generating a database operating instruction to update the dealing database of the POS server with the dealing management, making a copy of the database operating instruction, adding a different address respectively on a plurality of the database operating instructions, and transmitting the plurality of database operating instructions added the addresses toward respective the addresses.

According to the eighth embodiment of this invention, a method of dealing management for managing deals of products by using a POS server having a dealing database for storing information of the deals of products at a plurality of stores, comprises steps of processing dealing management of the deals of products operated at the stores, generating a database operating instruction to update the dealing database of the POS server with the dealing management, making a copy of the database operating instruction, adding a same address respectively on a plurality of the database operating instructions, and transmitting the plurality of database operating instructions added the addresses respectively toward the same address.

According to the ninth embodiment of this invention, a recording medium, storing a computer program for managing deals of products at a plurality of stores, comprises a receiving module for receiving a plurality of same database operating instructions to update a dealing database for storing information of the deals of products operated at local terminals provided in the stores about the operated deals of products from the local terminals every time the deal of products with at least one customer is completed, and a database updating module for updating the dealing database according to the received database operating instruction.

According to the tenth embodiment of this invention, a recording medium, storing a computer program for local terminals at stores connected with a POS server having a dealing database for storing information of deals of products at a plurality of stores, comprises a dealing management module for processing dealing management of the deals of products operated at the stores, a generating module for generating a database operating instruction to update the dealing database of the POS server with the dealing management, a copy module for making a copy of the database operating instruction, an addressing module for adding a different address respectively on a plurality of the database operating instructions, and a transmitting module for transmitting the plurality of database operating instructions added the addresses toward respective the addresses.

According to the eleventh embodiment of this invention, a recording medium, storing a computer program for local terminals at stores connected with a POS server having a dealing database for storing information of deals of products at a plurality of stores, comprises a dealing management module for processing dealing management of the deals of products operated at the stores, a generating module for generating a database operating instruction to update the dealing database of the POS server with the dealing management, a copy module for making a copy of the database operating instruction, an addressing module for adding a same address respectively on a plurality of the database operating instructions, and a transmitting module for transmitting the plurality of database operating instructions added the addresses respectively toward the same address.

It is not intended herein to mention all the possible embodiments of the invention so that many combinations of features and modifications can be made thereto without departing from the scope of the invention.

BRIEF DESCRIPTION OF THE DRAWINGS

FIG. 1 is an illustration showing a whole of a POS system;

FIG. 8 is a diagram showing a data format of a stock master file of the first control apparatus;

FIG. 9 is a diagram showing a data format of a receiving/shipping file of the first control apparatus;

FIG. 10 is a flowchart showing actions of the first local terminal when selling products to a customer;

FIG. 11 is a flowchart showing detailed actions of the first local terminal in the step of transmitting database operating instruction (S116) in FIG. 9;

THE BEST EMBODIMENT ACCORDING TO THIS INVENTION

Figure 2:
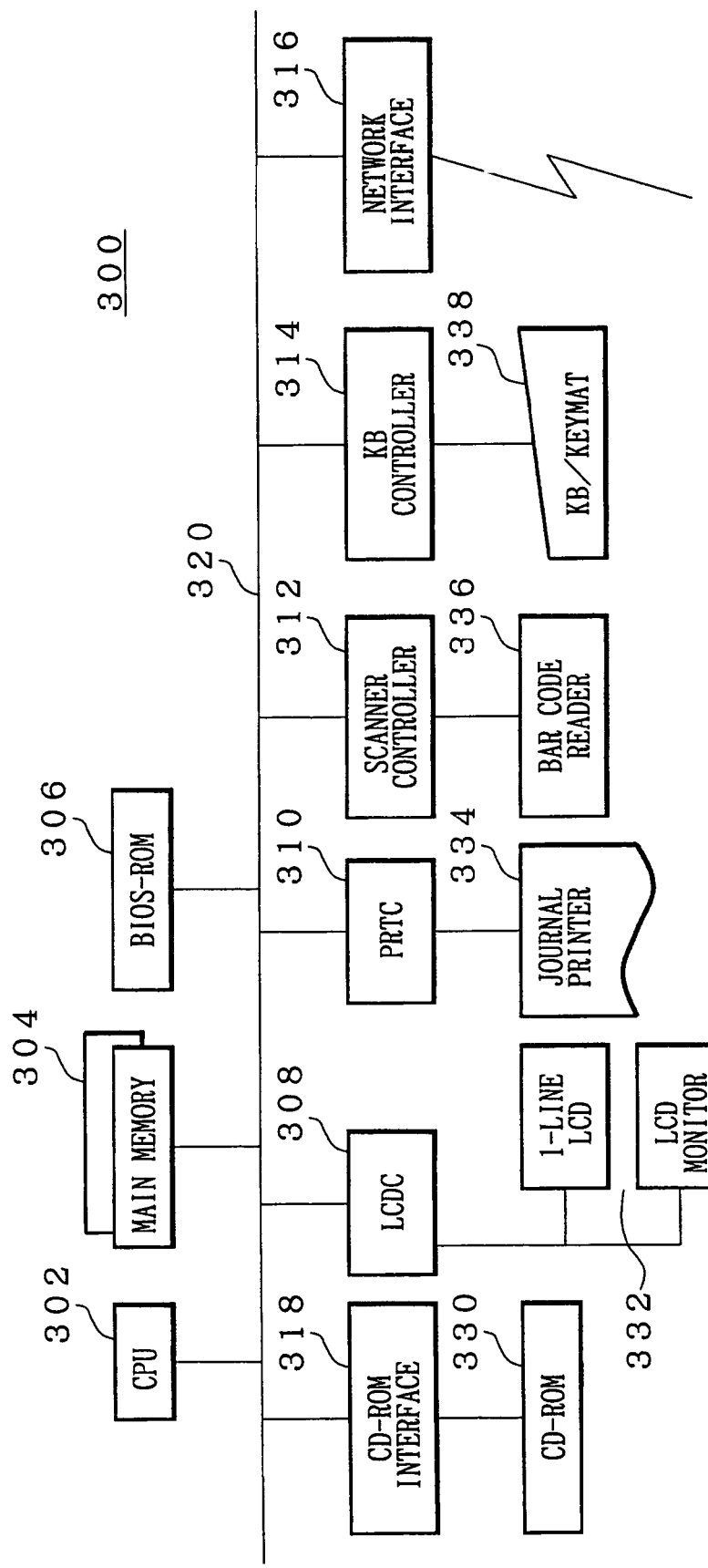
FIG. 2 is a block diagram showing a hardware structure of a local terminal at a store.

Embodiments according to this invention will be described hereafter. This claimed invention is not limited by following embodiments and all combinations of features described in the embodiments may not be required for solutions of this invention.

FIG. 1 shows the whole of the POS system. The POS system has the first local terminal 300a, the second local terminal 300b, (call a local terminal 300) and a POS server 100 managing a plurality of local terminals 300. The local terminals 300 are client computers. The local terminal 300 has a general-purpose commercial personal computer as a core device and peripheral devices such as a journal printer or a bar-code reader. Thereby, the local terminal 300 processes dealing of selling or purchasing at the store. The local terminal 300 connects through a rooter 12 with the POS server 100 to get necessary information.

The POS server is a computer for a server, and has a dealing database 116 for storing information of products including selling prices and information of dealing at the local terminal 300 that is received from the local terminal 300. The POS server 100 connects through the rooter 12 with the local terminal 300. The POS server 100 receives a database operating instruction from the local terminal 300 for updating the dealing database 116 with deals of products at the local terminal 300.

Internet communication network is shown as an example for network communication line herein. When security of the system is given importance, frame-relay network may be applied. Thus, connecting system is not limited.

FIG. 2 is a block diagram showing a hardware structure of the local terminal 300 shown in FIG. 1. The local terminal 300 includes a CPU 302, a main memory 304, a BIOS-ROM 306, a display controller (LCDC) 308, a printer controller (PRTC) 310, a scanner controller 312, a keyboard controller 314, a network interface 316, a CD-ROM interface 318, a CD-ROM 330, an LCD display 332, a journal printer 334, a barcode reader 336 and a keyboard/key-mat 338.

The CPU 302 executes arithmetic and logic operation accordingly to programs stored in the main memory 304 and the BIOS-ROM 306. The CPU 302 controls various peripheral devices such as the journal printer 310 and the barcode reader 312. The main memory 304 is formed with RAMs. The BIOS-ROM 306 stores a program for BIOS (Basic Input/Output System) for controlling connected peripheral devices. The LCDC 308 is connected with the LCD display 308 including the line display. The printer controller 310 is connected with the journal printer 334 for issuing receipts. The scanner controller 312 is connected with the barcode leader 336. The keyboard controller 314 is connected with a keyboard/keymat 338. The CD-ROM interface 318 controls the CD-ROM 330.

The network interface 316, structured by for example a modem card, is connected with the POS server 100 through a communication line network including the Internet. The local terminal 300 transmits information of dealings of products at the local terminal through the network interface 316 to the POS server 100 and receives a response for the transmitted information. An input/output bus 320 is formed with a plurality of lines for data address and control. Devices communicate data with each other through the input/output bus 320, and make respective own performances. Structure of the local terminal 300 including peripherals can be modified suitably according to feature of the store.

Figure 3:
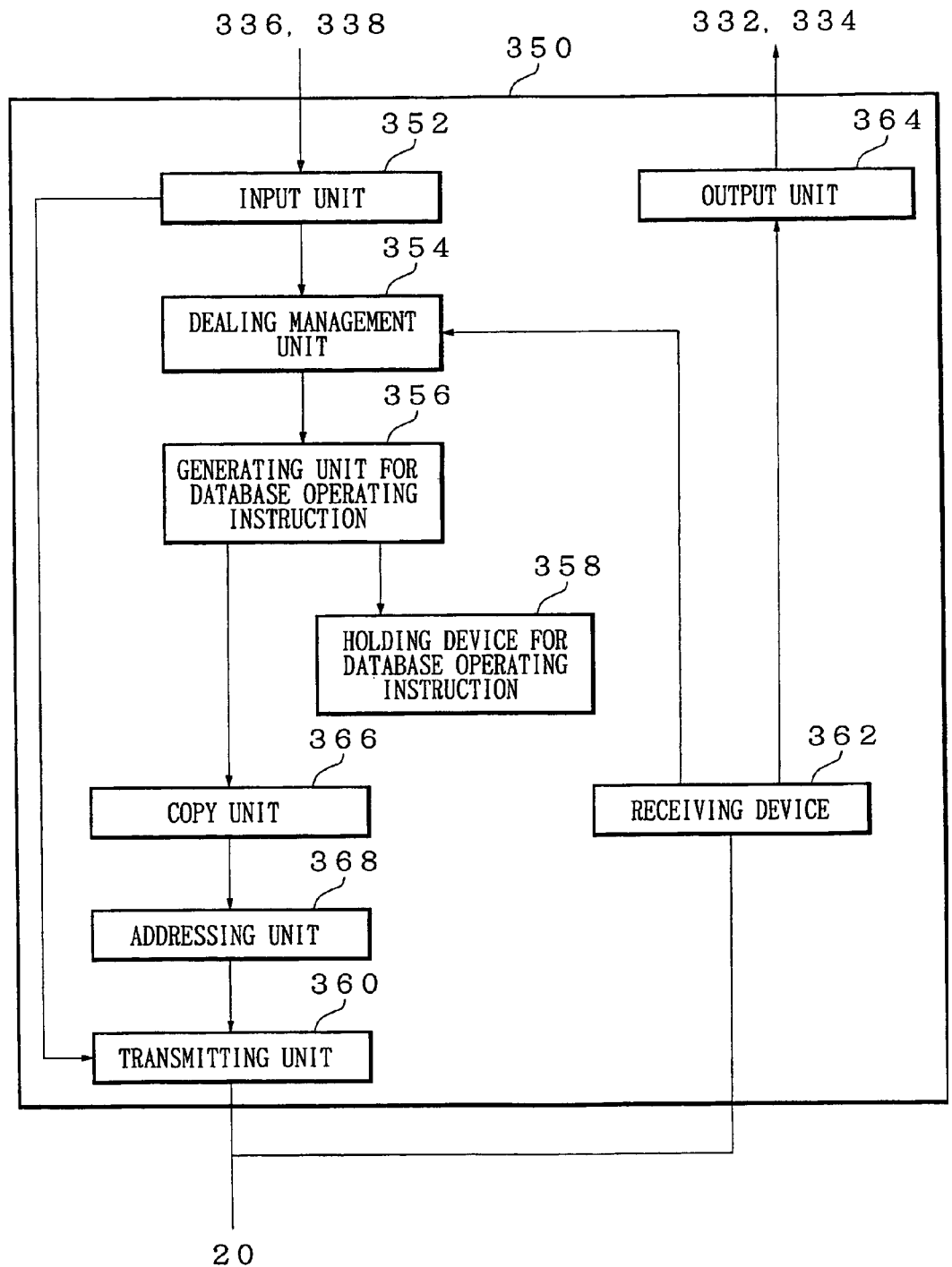
FIG. 3 is a functional block diagram showing functions of a processing device.

FIG. 3 is a function block diagram showing functions of the processing apparatus 350 to be performed by a hardware structure shown in FIG. 2. The processing apparatus 350 is a function block gathered with functions related to dealing process. A chain of actions of the processing apparatus 350 is executed mainly by the CPU 302, the main memory 304 and the program stored at the BIOS-ROM 305. Devices other than the above structure can execute the actions of the processing apparatus 350 so that design of the structure may be flexible. The processing apparatus 350 includes a input unit 352, a dealing management unit 354, a generating unit for database operating instruction 356, a holding unit for database operating instruction 358, a transmitting unit 360, a receiving unit 362, an output unit 364, a copy unit 266 and an addressing unit 368.

The input unit 352 is for inputting product codes, the number of products and product prices through the barcode reader 336 or the keyboard/keymat 338. The product codes may be barcode stuck on the products.

The dealing management unit 354 calculates accordingly to information inputted by the input unit 352. For example, the total of dealing with one customer is calculated. In case of selling products to customers, total purchasing price is calculated.

The generating unit for database operating instruction 356 generates a database operating instruction for updating the dealing database 116 of the POS server 100 with results processed by the dealing management unit 354. The database operating instruction may be an instruction to update the database of the POS server 100 with selling five pencils, or selling three erasers. When five pencils and three erasers are sold to one customer, the database operating instructions related to pencils and erasers are generated respectively. Thus, the database operating instruction is generated respectively for each product. The database operating instruction may be formed by SQL (Structured Query Language).

The copy unit 366 copies the database operating instruction received from the generating unit for database operating instruction 356. The addressing unit 368 adds the address for transmitting the each database operation instruction onto the each database operating instruction. The address may be an IP address.

The transmitting unit 360 receives the database operating instructions added the addresses by the addressing unit 368 and transmits them through the Internet 20 to each address. The transmitting unit 360 transmits requests for information of products to request the information of products including selling prices of the products to the POS server 100. The holding unit for database operating instruction 358 holds the database operating instructions generated by the generating unit for the database operating instruction 356.

The receiving unit 362 receives the information of products including the selling price through the Internet 20 from the POS server 100. The output unit 364 outputs information to make the journal printer 334 print the information and to make the LCD display 332 display the information toward the journal printer 334 and the LCD display 332. The output unit 364 also outputs information of dealings corresponding to the database operating instructions held at the holding unit for database operating instruction 358.

Figure 4:
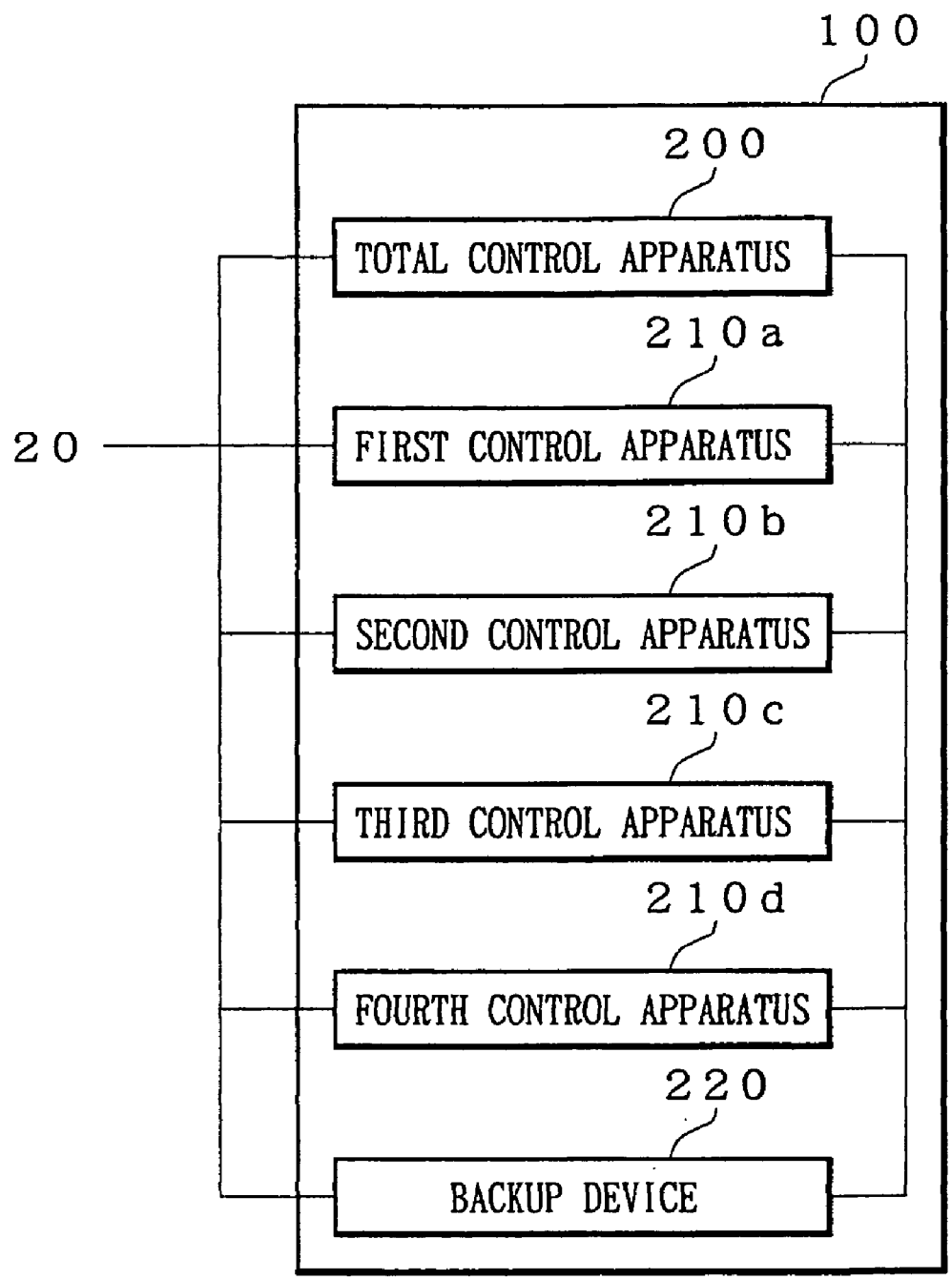
FIG. 4 is a block diagram showing a hardware structure of a POS server.

FIG. 4 is a block diagram showing the hardware structure of the POS server 100 shown in FIG. 1. The POS server 100 has a total control apparatus 200, a first control apparatus 210a, a second control apparatus 210b, a third control apparatus 210c, a fourth control apparatus 210d and a backup device 220. The total control apparatus 200, the first control apparatus 210a, the second control apparatus 210b, the third control apparatus 210c, the fourth control apparatus 210d and the backup device 220 can communicate through the Internet 20 with the plurality of local terminals 300 and a POS server other than the POS server 100.

The first control apparatus 210a and the second control apparatus 210b receive the database operating instruction respectively from the same local terminal 300. In other words, the first control apparatus 210a and the second control apparatus 210b receive the same database operating instruction added respectively an address of the first control apparatus 210a or the second control apparatus 210b transmitted from the first local terminal 300a. The third control apparatus 210c and the fourth control apparatus 210d receive the database operating instruction from a local terminal 300, for example a second local terminal 300b, other than the first local terminal 300a.

In short, the first control apparatus 210a and the second control apparatus 210b receive the database operating instruction from the first local terminal 300a, and the third control apparatus 210c and the fourth control apparatus 210d receive the database operating instruction from the second local terminal 300b.

Thus, when the plurality of local terminals 300 is controlled, the processing can be decentralized by controlling different local terminals 300 with a plurality of control apparatuses 210. Thereby, the POS server 100 can respond at real time for requests from the local terminals, even if the number of the local terminals to be controlled is large.

The total control apparatus 200 receives and manages the database operating instruction, which the first control apparatus 210a and the second control apparatus 210b receive from the first local terminal 300a, from at least one of the first control apparatus 210a and the second control apparatus 210b. The total control apparatus 200 also receives and manages the database operating instruction, which the third control apparatus 210c and the fourth control apparatus 210d receive from the second local terminal 300b, from at least one of the third control apparatus 210c and the fourth control apparatus 210d. Therefore, the total control apparatus 200 manages the database operating instructions received from all local terminals controlled by the POS server 100.

Thus, the total control apparatus 200 receives the database operating instructions received from all local terminals controlled by the POS server 100 so that, when the plurality of control apparatuses 210 manage different local terminals 300 respectively, the total control apparatus 200 can manage totally all local terminals 300.

The backup device 220 receives a database operating instruction added an address of the backup device 220. The backup device receives the same database operating instruction, which the first control apparatus 210a and the second control apparatus 210b receive from the first local terminal 300a, and the same database operating instruction, which the third control apparatus 210c and the fourth control apparatus 210d receive from the second local terminal 300b, through the Internet. When the database operating instructions are not received correctly at the first control apparatus 210a, the second control apparatus 210b and the total control apparatus 200, the backup device 220 transmits the database operating instruction respectively to the first control apparatus 210a, the second control apparatus 210b and the total control apparatus 200.

Thus, the backup device 220 has all database operating instructions managed by the POS server 100, so that when the first control apparatus 210a and the second control apparatus 210b could not receive correctly the database operating instructions, the backup device 220 transmits the database operating instructions thereto for recovering the database operating instruction which is lost.

When the third control apparatus 210c and the fourth control apparatus 210d could not receive correctly the database operating instructions, the backup device 220 also transmits the database operating instructions thereto for recovering the database operating instruction which is lost.

FIG. 4 shows the POS server 100 having a plurality of control apparatuses 210 as one group. These apparatuses may not be required in a physically one group so that the plurality of control apparatuses 210, the total control apparatus 200 and the backup device 220 may be disposed respectively at different places. In this case, respective control apparatuses 210, the total control apparatus 200 and the backup device 220 can communicate with the local terminals 300 through the Internet and communicate with the other apparatuses in the POS server 100 through communication line such as a LAN. For example, the first control apparatus 210a may be installed at Tokyo, and the second control apparatus 210b may be installed at Kyushu. Thus, a plurality of control apparatuses 210 can be installed at different locations, so that when the first control apparatus 210a does not work or is in busy traffic condition, the local terminal 300 can access to the second control apparatus 210b to process the same operation.

Figure 5:
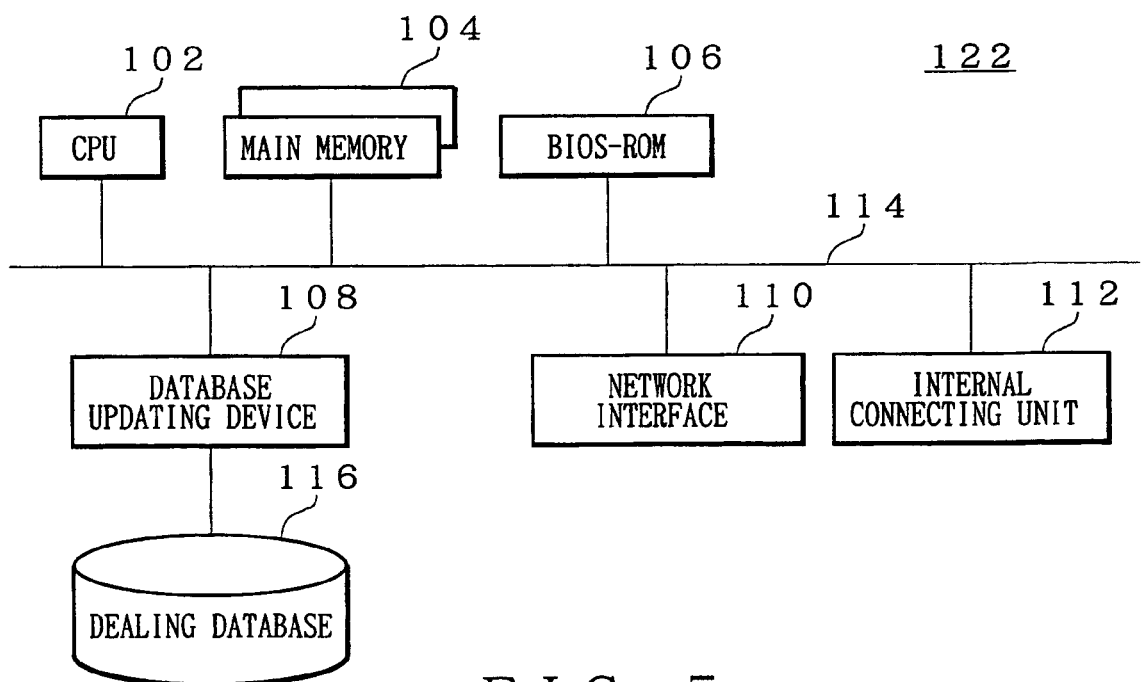
FIG. 5 is a block diagram showing a hardware structure of the first control apparatus.

FIG. 5 is a block diagram showing a hardware structure of the first control apparatus 210a shown in FIG. 4. The first control apparatus 210a includes a CPU 102, a main memory 104, a BIOS-ROM 106, a database updating device 108, a dealing database 116, a network interface 110, an internal connecting unit 112 and an input/output bus 114.

The CPU 102 executes arithmetic and logic operation accordingly to programs stored in the main memory 104 and the BIOS-ROM 106. The CPU 102 controls various peripheral devices. The main memory 104 is formed with RAMs. The BIOS-ROM 106 stores a program for BIOS (Basic Input/Output System) for controlling peripheral devices connected with the system. The database updating device 108 controls for formatting, reading and writing the dealing database 116. The dealing database 116 stores information of dealings at the local terminals 300.

The network interface 110 connecting through the Internet 20 with the local terminals 300 receives information of dealings at the local terminals 300. The network interface 110 transmits responses for the received information. The internal connecting unit 112 connects through a communication line, for example LAN, with the second control apparatus 210b, the total control apparatus 200 and the backup device 220. Thereby, the first control apparatus 210a, the second control apparatus 210b, the total control apparatus 200 and backup device 220 of the POS server 100 can transmit and receive information not through the Internet 20. Not showing in the diagram, the peripheral devices such as a LCD monitor and a keyboard of the control apparatus 210a connect through an exclusive input/output controller with the input/output bus 114 similarly as the local terminal 300 shown in FIG. 2.

Figure 6:
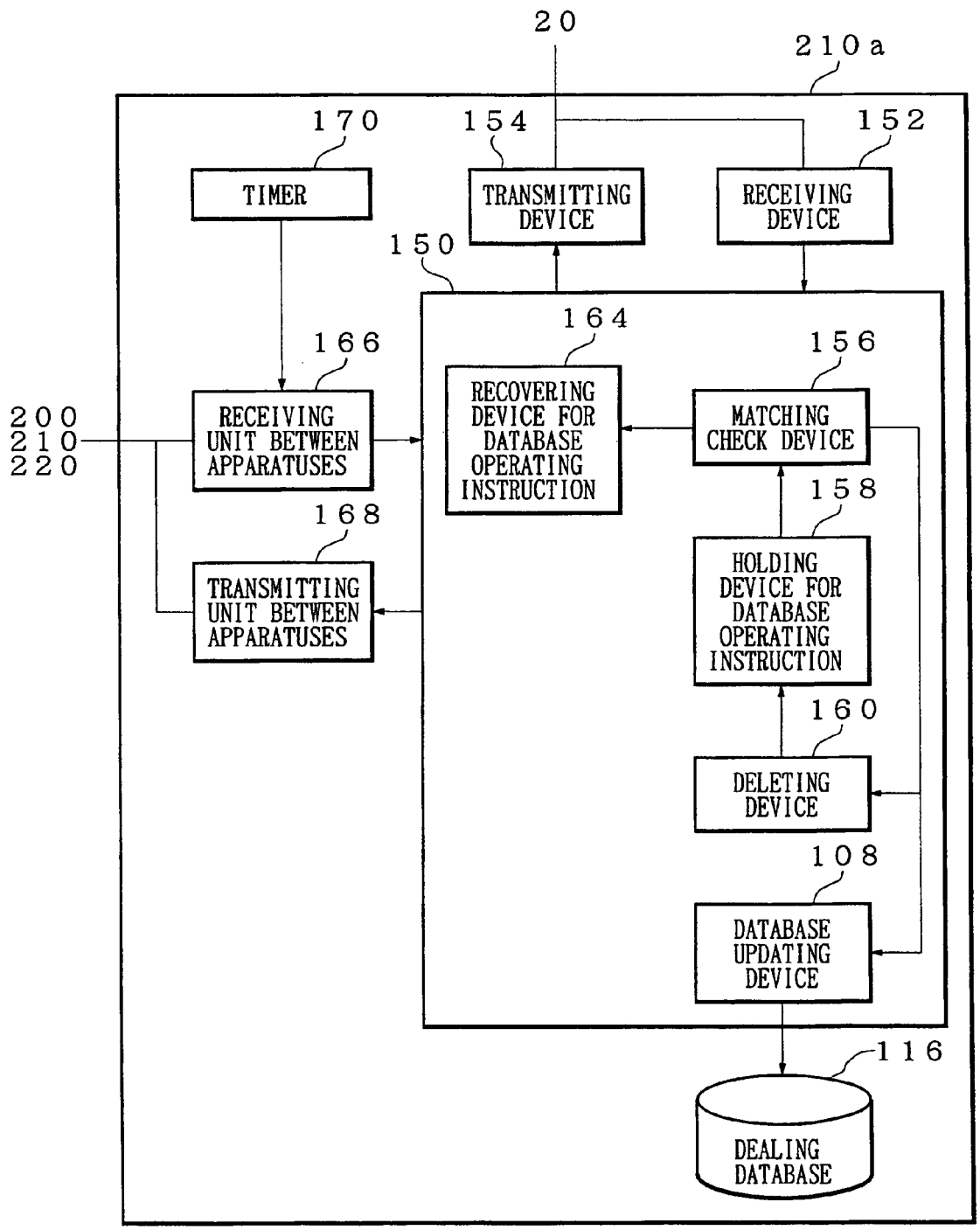
FIG. 6 is a functional block diagram showing functions of a processing device for database operating instructions.

FIG. 6 is a functional block diagram showing functions of a processing device 150 for database operating instructions having features of this embodiment in functions of the first control apparatus 210a applicable according to the structure of the hardware in FIG. 5. The processing device 150 for the database operating instruction is one unit integrating functions to execute the database operating instruction. A chain of actions of the processing device 150 is executed mainly by the CPU 102, the main memory 104 and the program stored at the BIOS-ROM 106. The processing device 150 can be structured by the other elements so that design of the structure may be flexible.

The processing device 150 has a matching check device 156, a holding device 158 for database operating instruction, a deleting device 160, a database updating device 108 and a recovering device 164 for database operating instruction.

The receiving device 152 receives the database operating instruction through the Internet 20. A receiving unit between apparatuses 166 receives the database operating instruction from the other control apparatus 210, and transmits that to the matching check device 156 or the holding device 158 for database operating instruction. The receiving unit between apparatus 166 receives the request of database operating instructions for requesting to transmit the database operating instruction from the other control apparatuses 210. A timer 170 measures time.

The holding device 158 for database operating instruction holds temporarily the database operating instructions received from the receiving device 152 and the receiving unit between apparatuses 166. The holding device 158 receives the request of database operating instructions from the receiving unit between apparatus 166 and transmits the database operating instruction pointed by the request of database operating instructions to transmit a transmitting unit between apparatuses 168.

The matching check device 156 receives the same database operating instructions transmitted by the first local terminal 300a respectively from the receiving unit between apparatuses 166 and the holding device 158 for database operating instruction. The matching check device 156 checks the matching of two database operating instructions.

When the matching of the database operating instructions is confirmed, the matching check device 156 transmits information of completion to inform that confirmation of the matching is completed to a transmitting device 154 and the deleting device 160. The matching check device 156 transmits the database operating instruction, of which matching is confirmed, to the database updating device 108. When the matching of the database operating instructions is not confirmed, in other words, the holding device 158 does not hold the database operating instruction to be held, the matching check device 156 transmits recovering instruction to get the database operating instruction which is lost to a recovering device 164 for the database operating instructions.

When the deleting device 160 receives the information of completion, the deleting device 160 deletes the database operating instruction held at the holding device 158. In other words, the deleting device 160 deletes the database operating instruction held at the holding device 158 in a necessary condition that the dealing database 116 is updated.

In the other example, when the deleting device 160 receives the information of completion, the deleting device 160 may indicate that the database operating instruction is executed and make the holding device 158 maintain the database operating instruction distinguishably. When the deleting device 160 receives the information of completion, the deleting device 160 may add a flag on the database operating instruction that is executed.

When the database updating device 108 receives the database operating instruction, the database updating device 108 executes the database operating instruction and updates the dealing database 1116. When the recovering device 164 for the database operating instructions receives recovering instruction from the matching check device 156, the recovering device 164 transmits the recovering instruction through the transmitting unit between apparatuses. The transmitting device between apparatuses 168 transmits the recovering instruction and the database operating instruction to the other control apparatus 210. The transmitting device 154 transmits the information of completion to local terminals 300.

Figure 7:
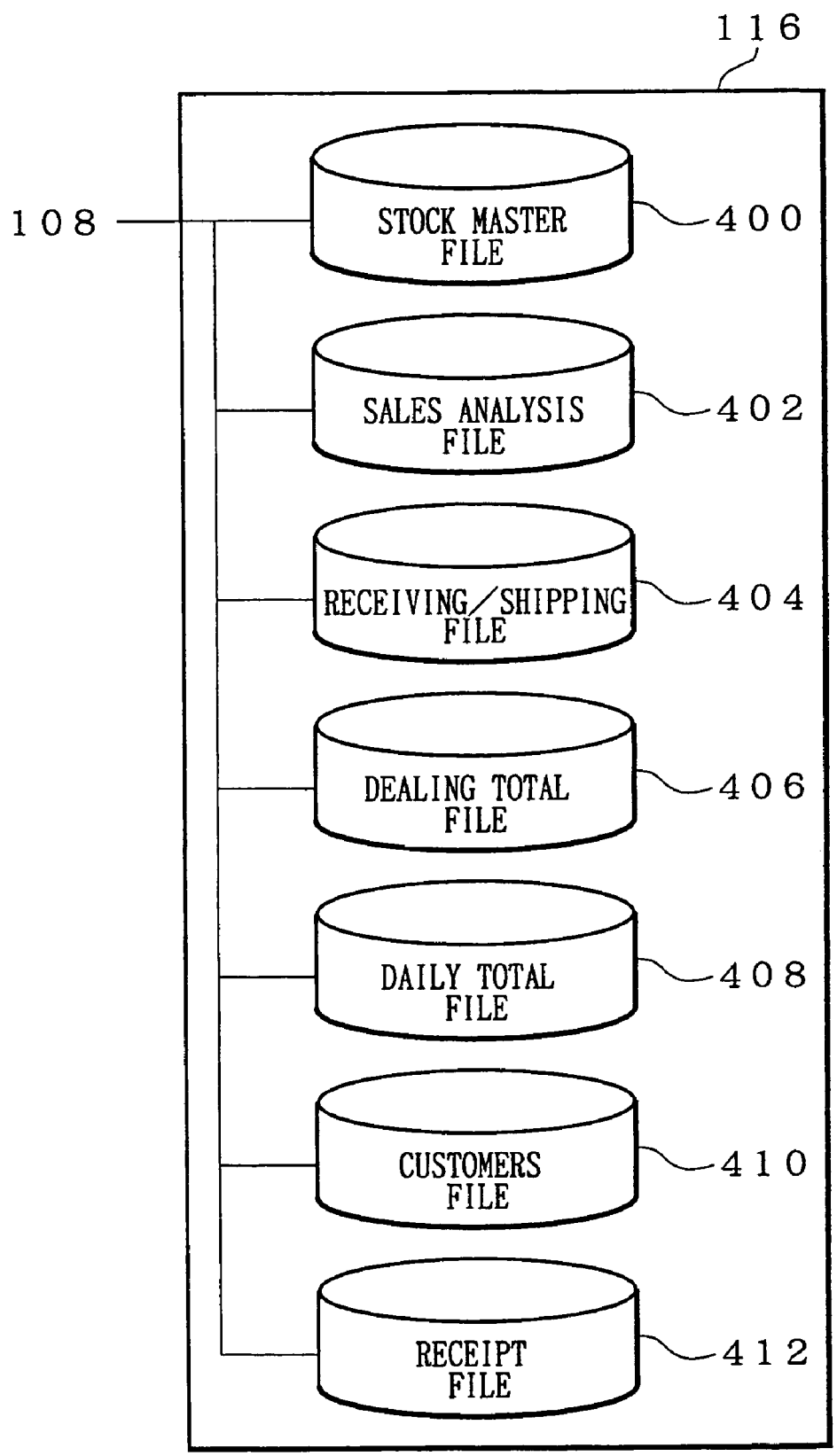
FIG. 7 is an illustration showing a structure of a dealing database of the first control apparatus.

FIG. 7 shows a structure of database stored at the dealing database 116 of the first control apparatus 210a. The dealing database 116 includes a stock master file 400, a sales analysis file 402, a receiving/shipping file 404, a dealing total file 406, a daily total file 408, a customers file 410 and a receipt file 412.

The sock master file 400 stores information of products including prices and the number of stock correspondingly to information of distinguishing products to be sold at stores controlled by the POS server 100. The receiving/shipping file 404 stores information of dealings for each product of the received dealing information from the local terminals 300 controlled by the first control apparatus 210a correspondingly to date of dealing. The sales analysis file 402 stores sales correspondingly to class of products. The dealing total file 406 stores monthly total of dealings. The daily total file 408 stores daily total of sales for each store. The customers file 410 stores dealing information of each customer for customer classes correspondingly to a plurality of customer classes. The receipt file 412 stores information of dealings for each receipt.

FIG. 8 shows a data format of a stock master file 400 of the first control apparatus 210a. The stock master file 400 stores the information of products correspondingly to product codes for distinguishing products. The stock master file 400 has a product code field, a product number field, a product name field, a selling price field and an amount of stock field. Code numbers for distinguishing products are stored in the product code field. Individual numbers of products are stored in the product number field. Names of products are stored in the product name field. Selling prices are stored in the selling price field. Current number of products in stock are stored in the amount of stock field.

According to this embodiment of the POS system, the local terminal 300 has no stock master file 400. Therefore, the local terminal 300 can be structured by a usual computer. Local terminal 300 can be installed more relatively easily.

The stock database 400 is provided in the POS server 100 so that the database can be updated easily.

FIG. 9 shows a data format of the receiving/shipping file 404 in the first control apparatus 210a. The receiving/shipping file 404 stores a store ID field, a date field, a class field, a slip number field, a product code field, a quantity field, a unit price field, a total price field and a tax field.

Information of distinguishing stores is stored in the store ID field. The store IDs are stored distinguishably correspondingly to each receiving/shipping data, so that the store where the dealing is acted can be distinguished. The date of dealing is stored in the date filed. Classes of operations are stored in the class field. For example, information, which shows whether the dealing is selling or purchasing, is stored. Serial numbers those are put on slips correspondingly to respective dealings are stored in the slip number field. Product codes of products, which were dealt, are stored in the product code field. Quantities of products, which were dealt, are stored in the quantity field. Unit prices of products, which were dealt, are stored in the unit price field. Total prices of products, which were dealt, are stored in the total price field. Taxes are stored in the tax field.

Information of dealings at the local terminals 300 controlled by the control apparatus 210 is stored in the receiving/shipping file 404 of the control apparatus 210. Therefore, when the local terminal 300 requests information of dealings to the control apparatus, the required information can be provided.

The second control apparatus 210b, the third control apparatus 210c and the fourth control apparatus 210d have the same structure and the same operations as the structure and operations of the first control apparatus 210a described with reference to FIG. 5-8 so that description about them is omitted.

The POS server 100 has the plurality of control apparatuses having the same structure and the same functions. Each control apparatus 210 can be given by a usual computer. Therefore, the POS system can be structured easily accordingly to a scale of the store.

Each control apparatus 210 can communicate through each Internet interface 114 with the local terminals 300. Case of increasing the number of communication lines, or increasing information content controlled by the POS server 100 can be solved by installing more control apparatuses 210.

Hardware structure of the total control apparatus 200 is described herein. The hardware structure of the total control apparatus 200 is almost same as that of the control apparatus 210 described with reference to FIG. 5-9. Following points are different from the first control apparatus 210a.

The first control apparatus 210a receives the database operating instruction through the Internet 20 from the local terminals 300. The total control apparatus 200 receives the database operating instruction from the control apparatuses 210. The receiving/shipping file 404 in the total control apparatus 200 stores all information stored respectively at the all receiving/shipping files 404 of the POS server 100. The stock master file 400 of the total control apparatus 200 stores all information of all products controlled by the POS server 100. The total control apparatus 200 is different on these points from the control apparatus 210.

The total control apparatus 200 receives and manages the database operating instructions from the control apparatuses 210, but does not transmit responses to the local terminals 300. Therefore, the total control apparatus 200 may not respond at the real time differently from the control apparatus 210. Thereby, the total control apparatus 200 does not require real time processing.

The POS server 100 has the total control apparatus 200 storing relatively large data and the control apparatuses 210 storing relatively small data. The total control apparatus 200 is preferably capable to store large data, but not required to communicate at real time. Oppositely, the control apparatus 210 is preferable to have the CPU 102 with processing speed capable to communicate with the local terminals 300 at real time. However, the control apparatus 210 may store relatively small data. Thereby, the POS server 100 includes the control apparatus 210 for charging mainly to communicate with the local terminals 300 and the total control apparatus 200 for charging mainly to manage the data. Thus, by decentralizing processing, real-time response and large data management can be performed.

Hardware structure of the backup device 220 is described herein. The hardware structure of the backup device 220 is almost same as that of the-control apparatus 210 described with reference to FIG. 5-9. The backup device, however, may not have the stock master file 400 and any databases other than this. The backup device 220 is different on these points of inner structure from the control apparatus 210. The backup device 220 has a holding portion for database operating instructions and maintains the received database operating instructions, and transmits the database operating instructions to the first control apparatus 210a, the second control apparatus 210b and the total control apparatus 200 accordingly to the request.

For the other example, the backup device 220 may have the receiving device 152, the transmitting device 154, the receiving unit between apparatuses 166, the transmitting unit between apparatuses 168 and the holding device 158 for database operating instructions. Accordingly, the backup device 220 can receive the database operating inspections and provides the database operating instructions to the other control apparatuses 210.

FIG. 10 is a flowchart showing actions of the first local terminal 300a when selling products to a customer. Generally, an operator at the store operates the barcode reader 336 or the keyboard/keymat 338 to input the product code to the input unit 352 (S100). Then, the transmitting unit 360 transmits the inputted product code through the network interface 316 to the POS server 100 (S102). At that time, when the product was sold at a different price from the price corresponding to the product code in case of discount sale, the actual selling price is transmitted to the POS server 100.

The information of the products pointed by the product codes transmitted to the POS server 100 is received (S104). The operator of a register inputs a quantity of the product corresponding to the product code inputted in S100 (S106). The dealing management unit 354 processes the dealing according to the amount of products and the selling price (S108). The output unit 364 displays the received information of products on the LCD display 308 (S110).

Thus, the local terminal 300 receives the information of products from the POS server 100 so that the information of products may not be stored previously. Therefore, the computer structuring the local terminal 300 may have relatively small data capacity. The information of products is stored at the POS server so that updating can be done easily and at real time. Thus, the local terminal 300 can manage dealings according to the latest information of products.

When other product is traded more, processing from S100 to S110 is repeated (S112). After processing from S100 to S110 is completed for all products (S112), the generating unit 356 for database operating instructions generates the database operating instructions to update the database of the POS server 100 with information of processing executed from S100 to S110 (S114). At that time, the generating unit 356 generates executive instruction to indicate executing the database operating instruction. Then, the transmitting unit 360 transmits the database operating instruction to the POS server 100 (S116). Simultaneously, the transmitting unit 360 transmits more the executive instruction. As mentioned above, operations of the first terminal 300a on selling products are completed.

The local terminal 300 transmits the database operating instruction and the executive instruction every time the dealing with one customer is completed, so that the POS server 100 can receive the database operating instruction every time the dealing is done. Thus, the POS server 100 can update the dealing database 116 with the information of dealing done at the local terminal 300 every time the dealing at the local terminal 300 is completed. In other words, the POS server 100 can update the dealing database 116 at real time. Thereby, the dealing database 116 can store the information of the dealing that is completed anytime. Therefore, the total till the time of dealing completed can be done according to data stored at the dealing database 116.

FIG. 11 is a flowchart showing detailed actions of the first local terminal 300a in the step of transmitting the database operating instruction (S116) in FIG. 9. The copy unit 366 copies the database operating instruction generated in the step of generating the database operating instruction (S114) to generate three database operating instructions (S130). The copy unit 366 copies the database operating instruction generated at the generating unit 356 for database operating instructions every time the local terminal 300 completes the dealing with a customer.

The addressing unit 368 adds each of addresses of the first control apparatus 210a, the second control apparatus 210b and the backup device 220 respectively on the same three database operation instructions received from the copy unit 366 (S132). Thereafter, the transmitting unit 360 transmits the three database operating instructions addressed by the addressing unit 368 through the Internet 20 (S134). When transmission of the database operating instructions is completed (S136) actions of the local terminal 300 are finished.

When transmission of the database operating instructions is not completed in S136, the holding device 358 for database operating instructions holds the database operating instruction (S138). Thereafter, the output unit 364 outputs information, which inform that the information of dealing and the database operating instruction could not be transmitted, to the journal printer 334 (S140). Thus, when the database operating instructions could not be transmitted, the information for informing that the information of dealing and the database operating instruction could not be transmitted is outputted to the journal printer 334 or LCD display 332 so that the operator of the register can recognize that the database operating instruction could not be transmitted.

Thereafter, the Internet interface 316 retransmits the database operating instruction held in the holding device 358 for database operating instructions (S142). Then, processing from S136 to S142 is repeated. Thus, the Internet interface 316 can transmit the database operating instruction to access again even if the database operating instruction could not be transmitted by the first access, so that transmission to the POS server can be done securely. After the database operating instruction is transmitted in S142, the database operating instruction stored in the holding device 358 may be deleted.

Actions of the second local terminal 300b on selling products to the customer are similar as the actions of the first local terminal 300a described with reference to FIGS. 10, 11. In case of the second local terminal 300b, the addressing unit 368 adds each of addresses of the third control apparatus 210c, the fourth control apparatus 210d and the backup device 220 in S132.

Figure 12:
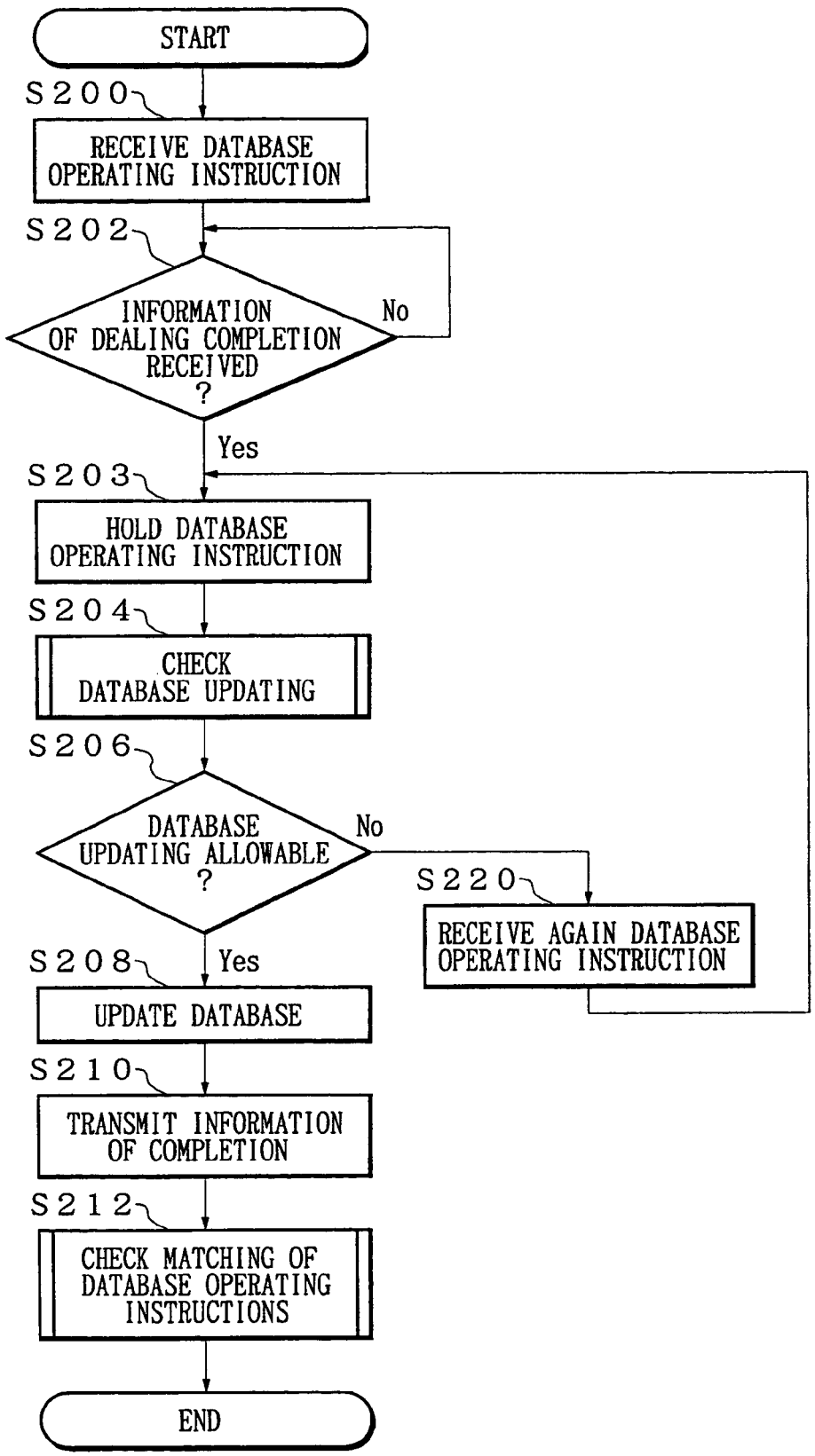
FIG. 12 is a flowchart showing actions of the first control apparatus of the POS server when receiving the database operating instruction from the local terminal at the store.

FIG. 12 is a flowchart showing actions of the first control apparatus 210a when the first control apparatus 210a, the second control apparatus 210b and the backup device 220 of the POS system receive the same database operating instruction addressed to each apparatuses or the device from the first local terminal 300a.

Firstly, the network interface 110 of the first control apparatus 210a receives the database operating instruction addressed to the first control apparatus 210a (S200). Then, the network interface 110 receives the information of dealing completion to inform that the dealing with one customer is completed (S202). When not receiving the information of dealing completion, the holding device 158 for database operating instructions maintains the database operating instruction until receiving the information of dealing completion and receives a plurality of database operating instructions.

When the network interface 110 receives the information of dealing completion in S202, the database updating device 162 check whether or not files stored in the dealing database 116 according to the database operating instruction can be updated (S204). When all files can be updated (S206), the all database are updated (S208). When the dealing database 116 cannot be updated in S206, the database operating instruction is received again from the first local terminal 330a (S220), and the process returns to the step of updating database (S204).

Thereafter, information of completion to inform that updating files is completed is transmitted to the first local terminal 300a (S210). Then, the matching check device 156 confirms matching of the database operating instruction stored in the holding device 158 for database operating instructions and the database operating instruction received through the receiving unit between apparatuses 166 from the second control apparatus 210b (S212). As mentioned above, the actions of the first control apparatus 210a on receiving the database operating instruction are finished.

Figure 13:
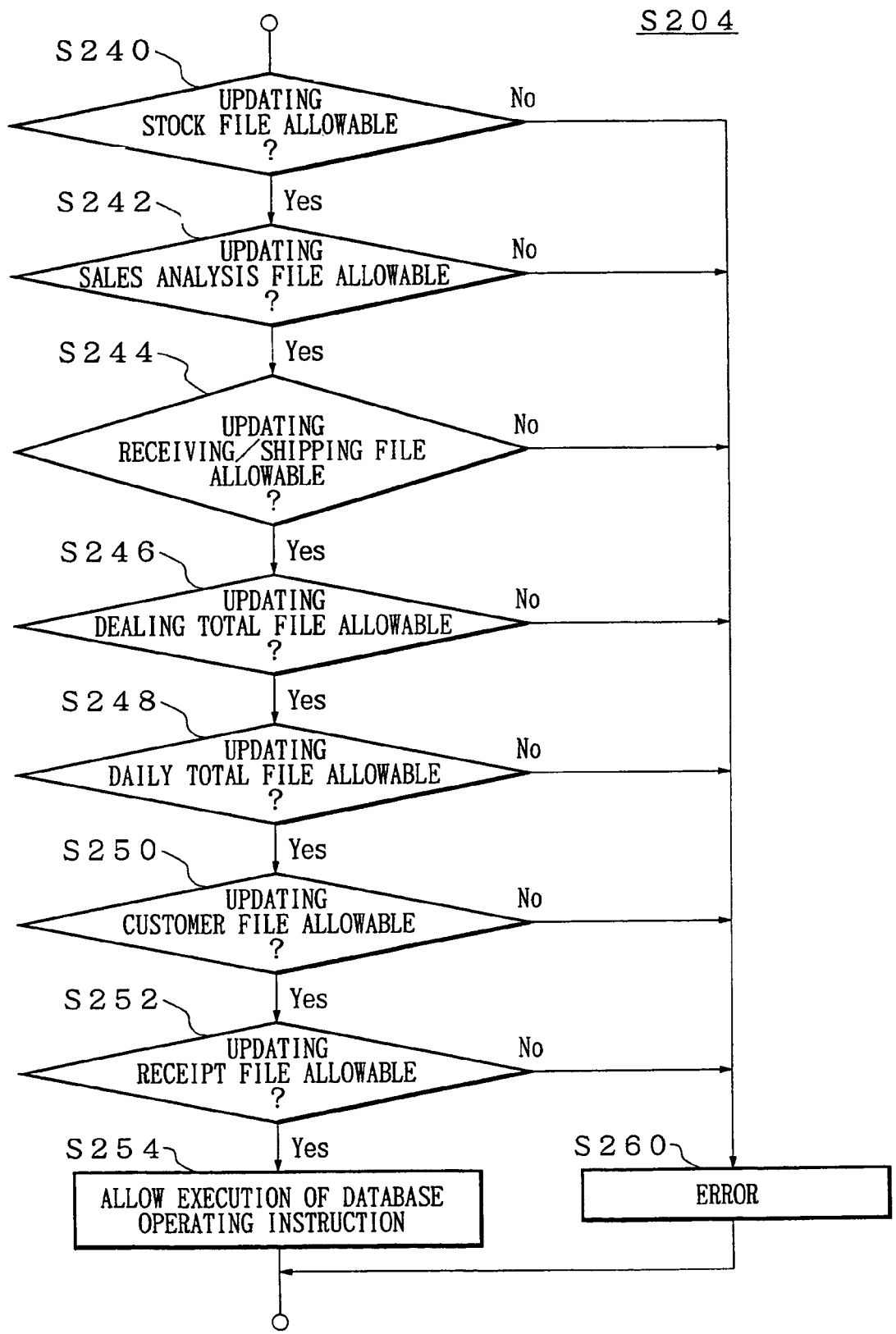
FIG. 13 is a flowchart showing detailed actions of the first control apparatus of the POS server in step of checking database update (S204) in FIG. 12.

FIG. 13 is a flowchart showing detailed actions of the first control apparatus 210a of the POS server 100 in step of checking database update (S204) in FIG. 12.

When the database updating device 108 receives the information of completion, the database updating device 108 checks whether or not updating the stock master file 400 is allowable. When the updating is allowable (S240), the database updating device 108 checks whether or not updating the sales analysis file 402 is allowable. When the updating is allowable (S242), the database updating device 108 checks whether or not updating the receiving/shipping file 404 is allowable. When the updating is allowable (S244), the database updating device 108 checks whether or not updating the dealing total file 406 is allowable. When the updating is allowable (S246), the database updating device 108 checks whether or not updating the daily total file 408 is allowable. When the updating is allowable (S248), the database updating device 108 checks whether or not updating the customers file 410 is allowable. When the updating is allowable (S250), the database updating device 108 checks whether or not updating the receipt file 412 is allowable. When the updating is allowable (S252), it is judged that the received database operating instruction is executable (S254).

A predetermined program for updating database is stored in the main memory 104 or BIOS-ROM 106. The program for updating database may be a stored procedure. The database updating instruction is executed according to the database operating instruction received from the local terminal 300. Then, the program is executed so as to convert the database operating instruction respectively to different instructions for each file and store them in respective files. Thus, by executing one database operating instruction, the different instructions for each file can be stored. The allowable updating includes adding a new file. For example, if there is no file for storing the database operating instruction, a new file may be generated to update the new file with information of the database operating instruction.

When updating the stock master file 400 is not allowable in S240, when updating the sales analysis file 402 is not allowable in S242, when updating the receiving/shipping file 404 is not allowable in S244, when updating the dealing total file 406 is not allowable in S246, when updating the daily total file 408 is not allowable in S248, when updating the customer file 410 is not allowable in S250, and when updating the receipt file 412 is not allowable in S252, error is judged (S260).

Figure 14:
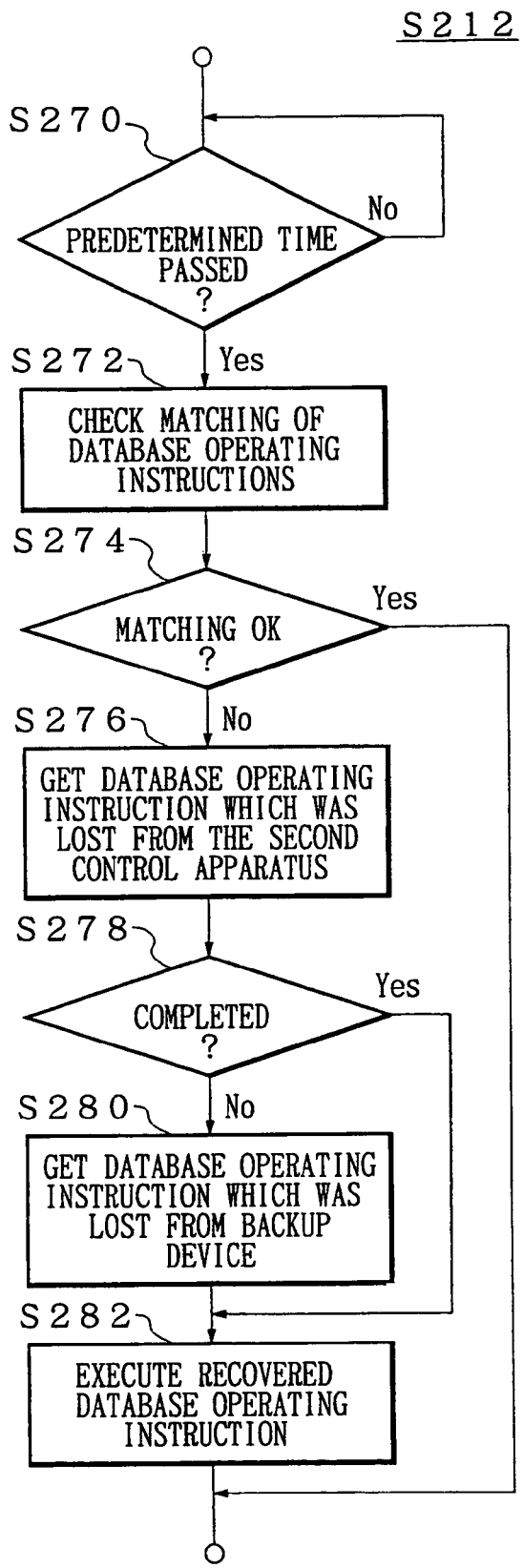
FIG. 14 is a flowchart showing detailed actions of the first control apparatus of the POS server in step of checking matching of the database operating instruction (S212) in FIG. 12.

FIG. 14 is a flowchart showing detailed actions of the first control apparatus 210a in step of checking matching of the database operating instruction (S212) in FIG. 12.

When the predetermined time passes (S279), the matching check device 156 checks the matching of the database operating instruction stored in the holding device 158 for database operating instructions and the database operating instruction stored in the holding device 158 of the second control apparatus 210b (S272). When the matching of the database operating instructions is confirmed (S274), the actions of the first control apparatus 210a are finished. Thus, the matching is checked at intervals of the predetermined time, in other words, checking the matching is executed only at the predetermined time so that load of the CPU 102 in the first control apparatus 210a can be reduced.

When the matching of the database operating instructions is not confirmed in S274, the recovering device 164 for database operating instructions requests the transmitting unit between apparatuses 168 to transmit a request of the database operating instruction to the first control apparatus 210a. The receiving unit between apparatuses 166 receives the requested database operating instruction according to the request (S276). When the database operating instruction could be received, the step jumps to S282. When the database operating instruction could not be received in S278, the recovering device 164 requests the transmitting unit between apparatuses 168 to make the backup device 220 transmit the database operating instruction (S280). Thereby, the receiving unit between apparatuses 166 receives the database operating instruction from the backup device 220. The receiving unit between apparatuses 166 makes the holding device 158 hold the received database operating instruction. The database updating device 108 updates the dealing database 116 according to the recovered database operating instruction (S282).

Thus, the first control apparatus 210a can recover the database operating instruction, which is lost, from the second local terminal 300b, even if the database operating instruction could not be received from the first local terminal 300a.

The actions of the second control apparatus 210b on receiving the database operating instruction from the first local terminal 300a are the same as the actions of the first control apparatus 210a described with reference to FIG. 12-14, so that the description is omitted. The actions of the third control apparatus 210c and the third control apparatus 210d on receiving the database operating instruction from the second local terminal 300b are also the same as the actions of the first control apparatus 210a described with reference to FIG. 12-14.

Figure 15:
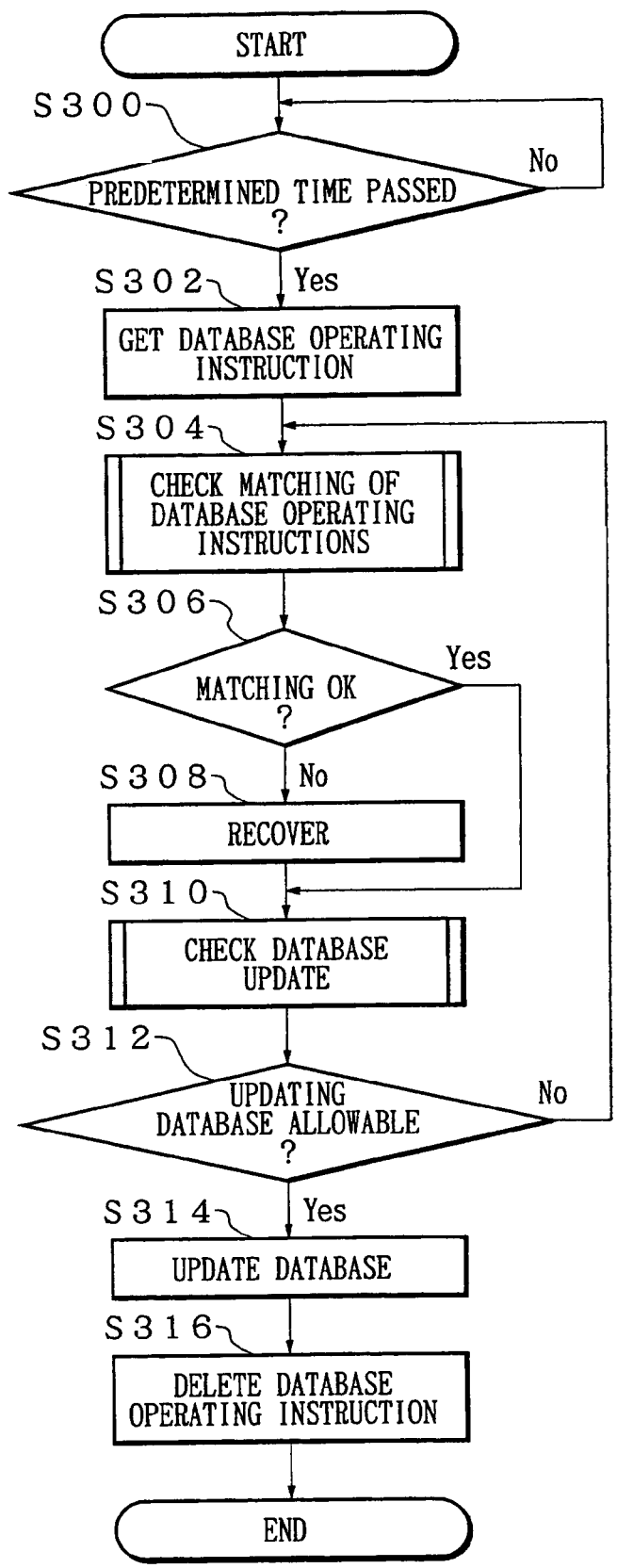
FIG. 15 is a flowchart showing actions of the total control apparatus of the POS server when receiving the database operating instruction from the first control apparatus.

FIG. 15 is a flowchart showing detailed actions of the total control apparatus 200 when receiving the database operating instruction from the first control apparatus 210a. When the timer 170 counts the predetermined time (S300), the receiving unit between apparatuses 166 of the total control apparatus 200 receives the database operating instruction from the first control apparatus 210a (S302). Thus, the database operating instruction is received at intervals of the predetermined time so that the CPU 102 can be used efficiently.

The matching check device 156 checks the matching of the received database operating instruction and the database operating instruction held at the first control apparatus 210a (S304). When the matching of the database operating instructions is not confirmed (S306), the recovering device 164 for database operating instructions recovers the database operating instruction, which is lost (S308). When the matching of the database operating instructions is confirmed in S306, the step jumps to S310.

As the other example, the total control apparatus 200 may receive the database operating instruction from the second control apparatus 210b. The total control apparatus 200 may receive just the database operating instruction from the first local terminal 300a and receive the database operating instruction of any one of the first control apparatus 210a and the second control apparatus 210b.

It is checked whether or not updating the dealing database 116 is allowable (S310). When updating the dealing database 116 is allowable, all files stored in the dealing database 116 are updated (S314). Thereafter, the deleting device 160 deletes the database operating instruction received from the first control apparatus 210a (S316). Thus, the database operating instruction is deleted after updating the dealing database 116 is completed so that the memories in each apparatus can be used efficiently.

Detailed actions of the total control apparatus 200 in S304 is the same as the actions of the first control apparatus 210a in S212 described with FIG. 14 so that the description is omitted. Detailed actions of the total control apparatus 200 in S310 is the same as the actions of the first control apparatus 210a in S204 described with FIG. 13 so that the description is also omitted.

The POS system according to the second embodiment is described herein. The POS server 100 of the second embodiment includes the first control apparatus 210a, the second control apparatus 210b, the third control apparatus 210c, the fourth control apparatus 210d, the total control apparatus 200 and the backup device 220. According to the POS server 100 of the second embodiment, the first control apparatus and the total control apparatus 200 receive the database operating instructions added respectively addresses of the first control apparatus 210a and the total control apparatus 200 from the first local terminal 300a. The POS server 100 of the second embodiment is different at this point from the POS server 100 of the first embodiment. In this case, the addressing unit 368 of the first local terminal 300a adds each of addresses of the first control apparatus 210a, the second control apparatus 210b and the backup device 220 respectively on the three database operation instructions.

Actions of the total control apparatus 200 when the POS server 100 of this embodiment receives the database operating instruction from the first local terminal 300a is the same as the actions of the first control apparatus 210a according to the first embodiment described with FIG. 12-14. The total control apparatus 200 of this embodiment checks the matching of the database operating instruction held in the holding device 158 of the first control apparatus 210a and the database operating instruction held in the holding device 158 of the total control apparatus 200 in S212 of FIG. 12. When the matching of the database operating instructions is confirmed, the deleting device 160 of the first control apparatus 210a deletes the database operating instruction held in the holding device 158. The deleting device 160 of the total control apparatus 200 deletes the database operating instruction held in the holding device 158.

Thus, when the first control apparatus 210a, the total control apparatus 200 and the backup device 220 receive the same database operating instruction, the database operating instructions are deleted after the matching of the database operating instructions is confirmed. Therefore, the CPU 102 can be used effectively.

According to this embodiment, the database operating instruction is transmitted directly from the first local terminal 300a to the total control apparatus 200. Thereby, the first control apparatus 210a is not required to transmit the database operating instruction to the total control apparatus 200 at intervals of the predetermined time.

As the other example, only the deleting device 160 of the first control apparatus 210a deletes the database operating instruction held in the holding device 158 of the first control apparatus 210a. And the database operating instruction held in the holding device 158 of the total control apparatus 200 may be held.

The total control apparatus 200 maintains the database operating instruction without deleting so that the total control apparatus 200 can transmit the database operating instruction held in the holding device 158 when updating the database of the other control apparatus 210. By transmitting the database operating instruction, load of communication is reduced in comparison with transmitting the data held in the dealing database 116.

Program executed by the CPU 102 of the POS server 100 may be supplied to a user by storing a recording medium such as a floppy disk or CD-ROM. Program executed by the CPU 302 of the local terminal 300 may be supplied to a user by storing a recording medium such as a floppy disk or CD-ROM. Each programs stored in the recording medium may be compressed or not. Each programs is installed from the recording medium to a hard disk drive and read into the main memory 104, 304 and executed by the CPU 102, 302.

The program performing the local terminal 300 according to the embodiment, that is installed in the hard disk drive, includes an input module, a dealing management module, a generating module for the database operating instruction, a copy module, an addressing module, a transmitting module, a receiving module and an output module. Actions of each module are the same as the actions of processing apparatus 350 described in FIG. 3 so that the description is omitted.

The program performing the first control apparatus 210a according to the embodiment, that is installed in the hard disk drive, includes a receiving module, a transmitting module, a matching check module, a recovering module, a deleting module, a database updating module, a receiving between apparatuses module, a transmitting between apparatuses module and a timer module. Actions of each module are the same as the actions of processing device 150 described in FIG. 6 so that the description is omitted.

All or a part of functions or actions of the POS server 100 and the local terminal 300 according to the embodiments described above can be stored in the floppy disk or the CD-ROM as the storing medium.

The programs may be executed by reading directly from the storing medium to the RAM or may be executed by reading to the RAM after installing to the hard disk drive firstly. The program may be stored in single recording medium or in a plurality of recording media. The encoded programs may be stored.

Instead of the floppy disk and the CD-ROM, an optical recording medium such as a DVD, a magnetic medium such as an MD, a magneto-optic recording medium such as a PD, a tape medium, a magnetic medium, and a semiconductor memory such as an IC card or a miniature card can be used. By using the storage device such as hard disk or the RAM of the server system connecting with a private communication network or the Internet 20 as the recording medium, the program may be provided through the communication network to the POS server 100 and the local terminals 300. These recording media are used only for structuring the POS server and the local terminals 300. Therefore, it is obvious that manufacturing and selling such media for above purpose infringe on the patent right according to this application.

While this invention herein is described above, technical cover area of this invention is not limited by description of the aforesaid embodiments. Various modifications or improvements can be added on the above embodiments. It is understood that various changes or improvements may be made without departing from the scope of this invention as defined by the following claims.

The POS server 100 according to this embodiment has the first control apparatus 210*a* controlling the first local terminal 300*a* and the second control apparatus 210*b* controlling the second local terminal 300*b*. As the first example of changes, the each control apparatuses 210 of the POS server 100 may control any local terminal 300. The number of the control apparatuses 210 of the POS server 100 is not limited by the embodiment.

When the number of the local terminals 300 controlled by the POS server 100 increases and data volume of the information stored in the dealing database of the POS server 100 increases, the POS server 100 may have more-than-five control apparatuses 210. For examples the POS server 100 may have the fifth control apparatus 210*e* additionally. The fifth control apparatus 210*e* can control the local terminals 300 other than the first local terminal 300*a* and the second local terminal 300*b*.

Thus, the number of the control apparatus 210 of the POS server 100 can be changed so that the number of the control apparatus 210 can be adjusted freely according to the number of the local terminal 300 controlled by the POS server 100, frequency and data volume in communication between the local terminal 300. The POS server 100 can be built according to the store size. The number of the control apparatus 210 can be changed freely so that when the load of the each control apparatus 210 is increased, the load of each control apparatus 210 can be reduced by adding the control apparatus more.

When the number of the local terminal 300 is small and frequency in communication is small, the POS server 100 may not have the second control apparatus 210*b*, the third control apparatus 210*c*, the fourth control apparatus 210*d* and the total control apparatus 200. Thus, the POS server 100 may have only the first control apparatus 210*a* and the backup device 220. When the POS server 100 controls relatively small store, the POS server 100 may have only one computer and one backup computer.

According to the embodiment, the total control apparatus 200 receives the database operating instruction to be received from the first local terminal 300*a* through the first control apparatus 210*a* as mentioned in FIG. 15. Instead of this, as the second change, the total control apparatus 200 may receive the database operating instruction both from the first control apparatus 210*a* and the second control apparatus 210*b*. In this case, the matching check device 156 of the total control apparatus 200 checks the matching of the database operating instructions received from the first control apparatus 210*a* and the second control apparatus 210*b*.

In the embodiment, when receiving the instruction of transmitting database, the database updating device 108 of the first control apparatus 210*a* checks the matching of the database operating instructions after updating the dealing database 116. Instead of this, as the third change, the database updating device 108 may update the dealing database 116 according to the database operating instruction after the matching check device 156 checks the matching.

As the fourth change, The POS server 100 may have only the first control apparatus 210*a* and the backup device 220. In this case, the first local terminal 300*a* receives two database operating instructions addressed with the address of the first control apparatus 210*a* and one database operating instruction addressed with the address of the backup device 220 from the first local terminal 300*a*. The first control apparatus 210*a* may check the matching of the two database operating instructions received from the first local terminal 300*a* and recovers the database operating instruction which is lost. In this case, the first local terminal 300*a* can transmits two database operating instructions to the POS server 100 through different path through the Internet 20. Thereby, when one of the instructions could not reach accurately to the POS server 100, recovering can be done with the other database operating instruction.

EFFECTS OF THE INVENTION

According to this invention, the POS server can respond immediately against request by local terminals. The low cost POS system can be provided.

What is claimed is:

1. A POS server that manages deals of products at a plurality of stores, a plurality of control apparatuses, each of said plurality of control apparatuses comprising:
   a dealing database that stores information of said deals of products operated at a plurality of local terminals;
   a receiving device that receives a database operating instruction from said local terminals to update said dealing database about said deals of products;
   a database updating device that updates said dealing database according to said database operating instruction to be received whenever said database operating instruction is received from said local terminals, whereby each of said receiving devices of said plurality of control apparatuses receives a same database operating instruction transmitted to said control apparatus from said local terminal;
   a holding device that holds said received database operating instruction;
   a matching check device that checks matching of said database operating instruction held at each of said holding devices of said plurality of control apparatuses; and a recovering device that recovers said database operating instruction lost at the holding device of one of said control apparatuses by getting the lost database operating instruction from one of said holding devices of said other control apparatuses that have said database operating instruction which is lost, wherein said database updating device updates said dealing database according to said recovered database operating instruction.

2. The POS server according to claim 1, wherein said matching check device checks matching of said database operating instruction held at each of said holding devices of said plurality of control apparatuses at intervals of a predetermined time.

3. The POS server according to claim 1, wherein said database updating device updates said dealing database according to said database operating instruction whenever a dealing at said local terminal is completed.

4. The POS server according to claim 1, wherein said matching check device checks matching of said database operating instruction after said database updating device updates said dealing database.

5. The POS server according to claim 4, wherein, when matching of said database operating instruction cannot be confirmed for all said holding devices, said recovering device recovers said database operating instruction for a holding device determined to not have a matching database operating instruction, and thereby, said database updating device updates said dealing database according to said recovered database operating instruction.

6. The POS server according to claim 1, wherein said matching check device checks matching of said database operating instruction held at each of said holding devices of said plurality of control apparatuses, and after matching of said database operating instruction is confirmed among all said holding devices, said database updating device updates said dealing database according to said database operating instruction.

7. The POS server according to claim 6, wherein, when said database operating instruction cannot be confirmed as matching in all said holding devices, said recovering device recovers said database operating instruction for a holding device determined to not have a matching database operating instruction, and thereby, said database updating device updates said dealing database according to said recovered database operating instruction.

8. The POS server according to claim 1, wherein said control apparatus furthermore comprises a deleting device for deleting said database operating instruction, which matching is checked by said matching check device, from said database operating instructions held at each of said holding devices of said plurality of control apparatuses in a condition that said database updating device updated said database according to said database operating instruction.

9. The POS server according to claim 1, further comprising a backup device for storing same information of said deals of products as that stored in said dealing database of said control apparatus, said backup device including:
a receiving device for receiving said database operating instruction transmitted toward said backup device; and
a holding device for holding said received database operating instruction, wherein said recovering device recovers said database operating instruction lost at said holding device of said control apparatuses by getting that from said holding device of said backup device.

10. The POS server according to claim 1 furthermore comprising:
said plurality of control apparatuses connecting with different local terminals; and
a total control apparatus for storing information of said deals of products stored in said plurality of control apparatuses, said total control apparatus including:
a receiving device for receiving said database operating instruction transmitted toward said total control apparatus by said local terminal;
a total dealing database for storing information of said deals of products operated at said local terminals being controlled by said POS server; and
a database updating device for updating said dealing database according to said received database operating instruction, whereby said at least one receiving device of said control apparatuses and said receiving device of said total control apparatus receive the same database operating instruction transmitted toward them from said local terminal.

11. The POS server according to claim 10, wherein said total control apparatus further includes:
a holding device for holding said received database operating instruction;
a matching check device for checking matching of said database operating instruction received by said total control apparatus and said database operating instruction held at said control apparatuses which has to store the same database operating instruction as that being received by said total control apparatus.

12. The POS server according to claim 11, furthermore comprising a deleting device for deleting said database operating instruction from said holding devices and setting the dealing complete under an essential condition that said database updating device of said control apparatus updated said dealing database according to said database operating instruction, and said dealing databases of said total control apparatus when said matching check device of said control apparatus and said total control apparatus checked matching of said database operating instructions held in said respective holding devices of said control apparatus and said total control apparatus.

13. The POS server according to claim 1 furthermore comprising:
said plurality of control apparatuses being connected with different local terminals; and
a total control apparatus for storing information of said deals of products stored in said plurality of control apparatuses, said total control apparatus including:
a receiving device for receiving said database operating instruction held in said holding devices of said plurality of control apparatuses from any one of said control apparatuses;
a total dealing database for storing information of said deals of products operated at said local terminals being controlled by said POS server; and
a database updating device for updating said database according to said received database operating instruction.

14. The POS server according to claim 13 wherein said receiving device of said total control apparatus receives said database operating instruction from any one of said plurality of control apparatuses at intervals of a predetermined time.

15. The POS server according to claim 14, wherein said total control apparatus further includes:
a holding device for holding said received database operating instruction;
a matching check device for checking matching of said database operating instruction received by said total control apparatus and said database operating instruction held at said control apparatuses which has to store the same database operating instruction as that being received by said total control apparatus.

16. The POS server according to claim 13, wherein said total control apparatus further includes:
a holding device for holding said received database operating instruction;
a matching check device for checking matching of said database operating instruction received by said total control apparatus and said database operating instruction held at said control apparatuses which has to store the same database operating instruction as that being received by said total control apparatus.

17. A POS server for managing deals of products at a plurality of stores comprising:
a dealing database that stores information of said deals of products operated at a plurality of local terminals provided in said plurality of stores;
a receiving device that receives a database operating instruction from each of a plurality of different control apparatuses, where each database operating instruction is the same, to update said dealing database about said deals of products from said local terminals every time said deals of products with at least one customer is completed; and
a database updating device that updates said dealing database according to said received database operating instruction.

18. A local terminal, which is connected with a POS server having a dealing database for storing information of deals of products at a plurality of stores, comprising:
a dealing management unit that processes dealing management of said deals of products operated at said stores;
a generating unit that generates a database operating instruction to update said dealing database of said POS server with said dealing management;
a copy unit that makes a copy of said database operating instruction for each of a first control apparatus, a second control apparatus and a backup device;
an addressing unit that provides a same address respectively on each of the copies of said database operating instructions, where the same address is added for said first control apparatus, said second control apparatus and said backup device;
a transmitting unit that transmits said plurality of database operating instructions including said addresses respectively toward said same address; and
a network interface through which said plurality of database operating instructions are transmitted, the network interface including at least one communication network including the internet so that the local terminal communicates with the POS server through the internet.

19. The local terminal according to claim 18, wherein said copy unit makes a copy of said generated database operating instruction whenever said dealing management unit completes dealing management.

20. The local terminal according to claim 19, being connected with said control apparatus and said backup device of said POS server, wherein said addressing unit adds addresses of said backup device and said control apparatus of said POS server onto said plurality of database operating instructions.

21. The local terminal according to claim 19, being connected with at least one of said plurality of control apparatuses of said POS server and with said total control apparatus managing said plurality of control apparatuses, wherein said addressing unit adds addresses of at least one of said control apparatuses connecting with said terminals and said total control apparatus onto said plurality of database operating instructions.

22. The local terminal according to claim 18 being connected with said control apparatus and said backup device of said POS server, wherein said addressing unit adds addresses of said backup device and said control apparatus of said POS server onto said plurality of database operating instructions.

23. The local terminal according to claim 18 being connected with at least one of said plurality of control apparatuses of said POS server and with said total control apparatus managing said plurality of control apparatuses, wherein said addressing unit adds addresses of at least one of said control apparatuses connecting with said terminals and said total control apparatus onto said plurality of database operating instructions.

24. A POS system, having a POS server with a dealing database for storing information of deals of products operated at a plurality of stores and local terminals at said plurality of stores being connected with said POS server, each of said local terminals comprising:
a dealing management unit for processing dealing management of said deals of products operated at said stores;
a generating unit that generates a database operating instruction to update said dealing database of said POS server with said dealing management;
a copy unit that makes a copy of said database operating instruction;
an addressing unit that provides a different address respectively on a plurality of said database operating instructions and for at least one control apparatus and a backup device; and
a transmitting unit that transmits said plurality of database operating instructions being added said addresses toward the at least one control apparatus and the backup device, said POS server having a plurality of control apparatuses connecting with said plurality of local terminals provided at said plurality of stores, each of said plurality of control apparatuses comprising:
a dealing database that stores information of said deals of products operated at said local terminals;
a receiving device that receives a database operating instruction to update said dealing database about said deals of products; and
a database updating device that updates said dealing database according to said received database operating instruction, whereby each of said receiving devices of said plurality of control apparatuses receives said database operating instruction transmitted to said control apparatus from said local terminal;
a holding device that holds said received database operating instruction;
a matching check device that checks matching of said database operating instruction held at each of said holding devices of said plurality of control apparatuses and said database operating instruction corresponding thereto;
a recovering device that recovers said database operating instruction lost at the holding device of one of said control apparatuses by getting that the lost database operating instruction from any-one of said holding devices of said other control apparatuses that have said database operating instruction which is lost, wherein said database updating device updates said dealing database according to said recovered database operating instruction; and a network interface through which said plurality of database operating instructions are transmitted, the network interface having at least one communication network including the internet so that the local terminals communicate with each other and with one or more control apparatuses through the internet.

25. A method of dealing management for managing deals of products at a plurality of stores, comprising steps of:
   transmitting a database operating instruction stored in a holding device of a first control apparatus to a match checking device of a second control apparatus;
   transmitting another database operating instruction from a holding device of the second apparatus to the match checking device;
   checking the matching of the two database operating instructions to update a dealing database of the second control apparatus for storing information of said deals of products operated at local terminals provided in said stores about said operated deals of products from said local terminals every time said deals of products with at least one customer is completed; and
   updating said dealing database according to said received database operating instruction when the matching of the two database instructions is confirmed.

26. A method of dealing management for managing deals of products by using a POS server having a dealing database for storing information of said deals of products at a plurality of stores, comprising steps of:
   processing dealing management of said deals of products operated at said stores;
   generating a database operating instruction to update said dealing database of said POS server with said dealing management;
   making a copy of said database operating instruction for each of a first control apparatus, a second control apparatus and a backup device;
   adding a same address respectively on each of the copies of said database operating instructions, where the same address is added for said first control apparatus, said second control apparatus and said backup device; and
   transmitting said plurality of database operating instructions including said addresses respectively toward said same address.

27. A device for managing deals of products at a plurality of stores comprising:
   a receiving module receiving a plurality of same database operating instructions to update a dealing database for storing information of said deals of products operated at local terminals provided in said stores about said operated deals of products from said local terminals every time said deal of products with at least one customer is completed;
   and a database updating module updating said dealing database according to said received database operating instruction.

28. A device for local terminals at stores connected with a POS server having a dealing database for storing information of deals of products at a plurality of stores, comprising:
   a dealing management module processing dealing management of said deals of products operated at said stores;
   a generating module generating a database operating instruction to update said dealing database of said POS server with said dealing management;
   a copy module making a copy of said database operating instruction for each of a first control apparatus, a second control apparatus and a backup device;
   an addressing module adding a same address respectively on each of the copies of said database operating instructions, where the same address is added for said first control apparatus, said second control apparatus and said backup device; and
   a transmitting module transmitting said plurality of database operating instructions including said addresses respectively toward said same address.

* * * * *